United States Patent
Zhang et al.

(10) Patent No.: US 12,321,051 B1
(45) Date of Patent: Jun. 3, 2025

(54) MODE CONVERTER

(71) Applicant: HyperLight Corporation, Cambridge, MA (US)

(72) Inventors: Mian Zhang, Cambridge, MA (US); Prashanta Kharel, Cambridge, MA (US); Christian Reimer, Wellesley, MA (US); Kevin Luke, Cambridge, MA (US); David J. Starling, Waltham, MA (US)

(73) Assignee: HyperLight Corporation, Cambridge, MA (US)

( * ) Notice: Subject to any disclaimer, the term of this patent is extended or adjusted under 35 U.S.C. 154(b) by 168 days.

(21) Appl. No.: 17/980,490

(22) Filed: Nov. 3, 2022

Related U.S. Application Data

(60) Provisional application No. 63/276,200, filed on Nov. 5, 2021.

(51) Int. Cl.
*G02F 1/03* (2006.01)
*G02F 1/035* (2006.01)

(52) U.S. Cl.
CPC ........ *G02F 1/035* (2013.01); *G02F 2201/063* (2013.01); *G02F 2202/20* (2013.01)

(58) Field of Classification Search
CPC . G02F 1/035; G02F 2201/063; G02F 2202/20
USPC .......................................................... 385/2
See application file for complete search history.

(56) References Cited

U.S. PATENT DOCUMENTS

| | | | |
|---|---|---|---|
| 4,448,479 A | 5/1984 | Alferness |
| 4,553,810 A | 11/1985 | Alferness |
| 4,961,619 A | 10/1990 | Hernandez-Gil |
| 5,091,981 A | 2/1992 | Cunningham |
| 5,157,756 A | 10/1992 | Nishimoto |
| 5,799,119 A | 8/1998 | Rolland |
| 6,853,793 B1 | 2/2005 | Van Der Vliet |
| 6,934,446 B2 | 8/2005 | Rasras |
| 7,155,088 B2 | 12/2006 | Thapliya |
| 7,251,406 B2 | 7/2007 | Luo |
| 7,333,691 B1 | 2/2008 | Gill |
| 7,801,400 B2 | 9/2010 | Sugiyama |

(Continued)

FOREIGN PATENT DOCUMENTS

| | | |
|---|---|---|
| CN | 109633608 | 4/2019 |
| IN | 111736403 | 2/2022 |

(Continued)

OTHER PUBLICATIONS

Extended European Search Report for Application 20836102.2, dated Jun. 21, 2023 (Year: 2023).

(Continued)

*Primary Examiner* — Jerry M Blevins
(74) *Attorney, Agent, or Firm* — Van Pelt, Yi & James LLP

(57) ABSTRACT

An electro-optic device is described. The electro-optic device includes a ridge waveguide and a channel waveguide. The ridge waveguide includes a first portion of at least one electro-optic material. The first portion of the electro-optic material(s) includes a slab and a ridge on the slab. The ridge has a ridge height. The slab has a slab height less than the ridge height. The channel waveguide is optically coupled with the ridge waveguide and includes a second portion of the electro-optic material(s). The channel waveguide has a channel height less than the slab height.

19 Claims, 11 Drawing Sheets

(56) References Cited

U.S. PATENT DOCUMENTS

| | | |
|---|---|---|
| 8,346,025 B2 | 1/2013 | Gill |
| 8,600,198 B2 | 12/2013 | Sudo |
| 9,036,954 B2 | 5/2015 | Kobrinsky |
| 9,460,740 B1 | 10/2016 | Staffaroni |
| 9,465,163 B2 | 10/2016 | Kumar |
| 9,759,982 B2 | 9/2017 | Feng |
| 9,778,417 B2 | 10/2017 | Cherchi |
| 9,817,186 B2 | 11/2017 | Kamei |
| 9,939,709 B2 | 4/2018 | Shinji |
| 10,241,273 B2 | 3/2019 | Tu |
| 10,317,770 B2 | 6/2019 | Kono |
| 11,181,760 B2 | 11/2021 | Zhang |
| 11,815,750 B2 | 11/2023 | Zhang |
| 2003/0068152 A1* | 4/2003 | Gunn, III ............. G02B 6/1228 385/132 |
| 2004/0037497 A1 | 2/2004 | Lee |
| 2004/0151423 A1 | 8/2004 | Izhaky |
| 2006/0210212 A1 | 9/2006 | Sugiyama |
| 2009/0142019 A1 | 6/2009 | Popovic |
| 2011/0081107 A1 | 4/2011 | Sugiyama |
| 2011/0262071 A1 | 10/2011 | Mitomi |
| 2011/0317956 A1 | 12/2011 | Sudo |
| 2012/0027337 A1 | 2/2012 | Kondou |
| 2015/0260916 A1 | 9/2015 | Cherchi |
| 2015/0293427 A1 | 10/2015 | Goi |
| 2016/0327751 A1 | 11/2016 | Wu |
| 2017/0351025 A1 | 12/2017 | Trita |
| 2018/0211685 A1 | 7/2018 | Mehfuz |
| 2019/0361315 A1 | 11/2019 | Zhou |
| 2020/0088942 A1 | 3/2020 | Bian |
| 2020/0359116 A1 | 11/2020 | Mehrvar |
| 2021/0080796 A1 | 3/2021 | Kissa |
| 2021/0278597 A1 | 9/2021 | Sugiyama |
| 2021/0325607 A1 | 10/2021 | Oka |
| 2023/0375781 A1* | 11/2023 | Take .................... G02F 1/0316 |

FOREIGN PATENT DOCUMENTS

| | | |
|---|---|---|
| JP | 6476876 | 3/2019 |
| WO | 2018031916 | 2/2018 |

OTHER PUBLICATIONS

Chen et al., Broadband Adiabatic Polarization Rotator-Splitter Based on a Lithium Niobate on Insulator Platform, Photonics Research, vol. 9, No. 12 / Dec. 2021, pp. 2319-2324.

Search Report from corresponding International Application No. PCT/US2020/070252, mailed Oct. 22, 2020.

Wang et al., Efficient Polarization Splitter-Rotator on Thin-Film Lithium Niobate, Optics Express, vol. 29, No. 23 / Nov. 8, 2021, pp. 38044-38052.

Bristow et al., "Depolarization of Single Mode Channel Waveguides on Lithium Niobate", SPIE 0835, pp. 233-237 (Year: 1987).

Ma et al., "Ultralow loss single layer submicron silicon waveguide crossing for SOI optical interconnect." Optics Express, vol. 21, No. 24, pp. 29374-29382, Year 2013.

Sanchis et al., "Highly efficient crossing structure for silicon-on-insulator waveguides" Optics Letters/ vol. 34, No. 18, pp. 2760-2762 (Year: 2009).

\* cited by examiner

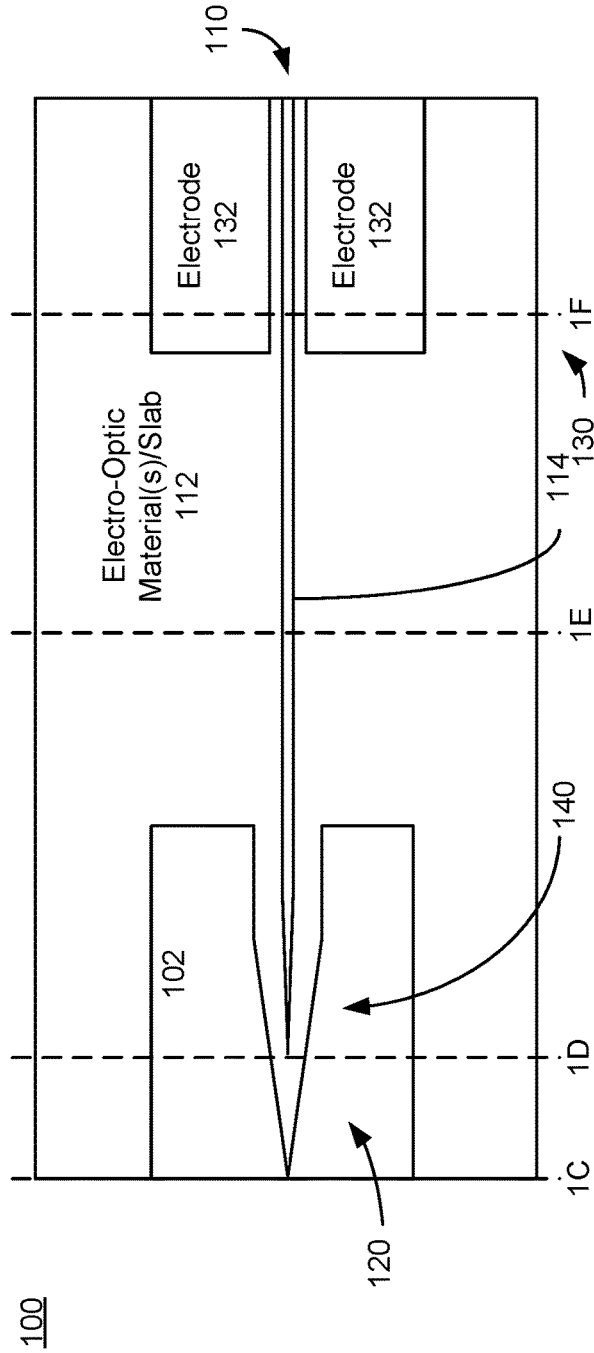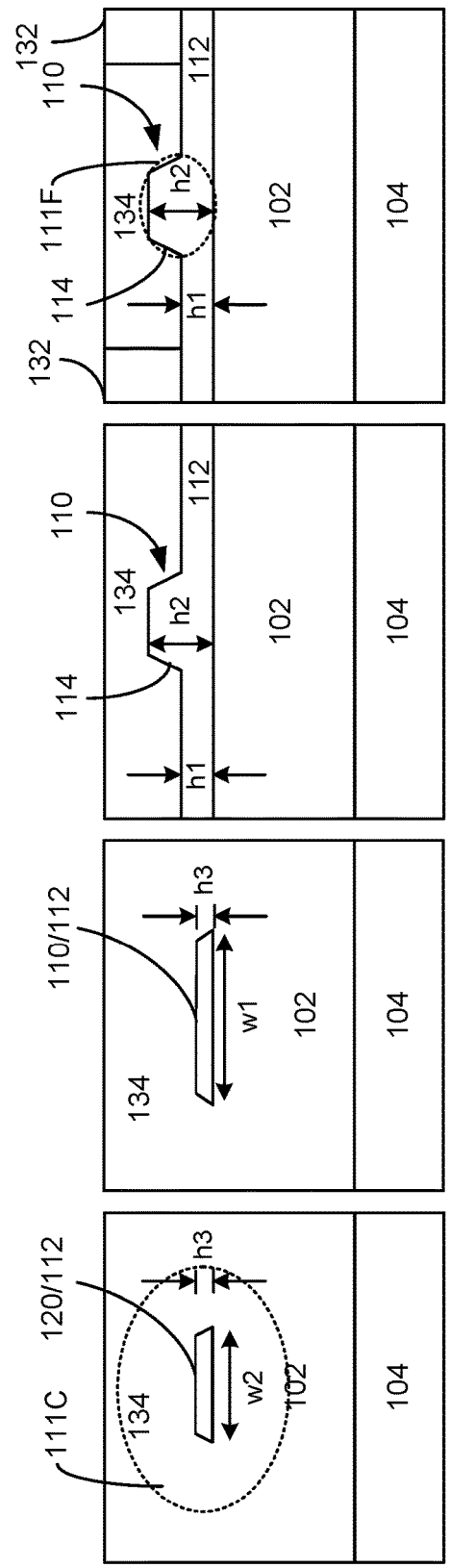

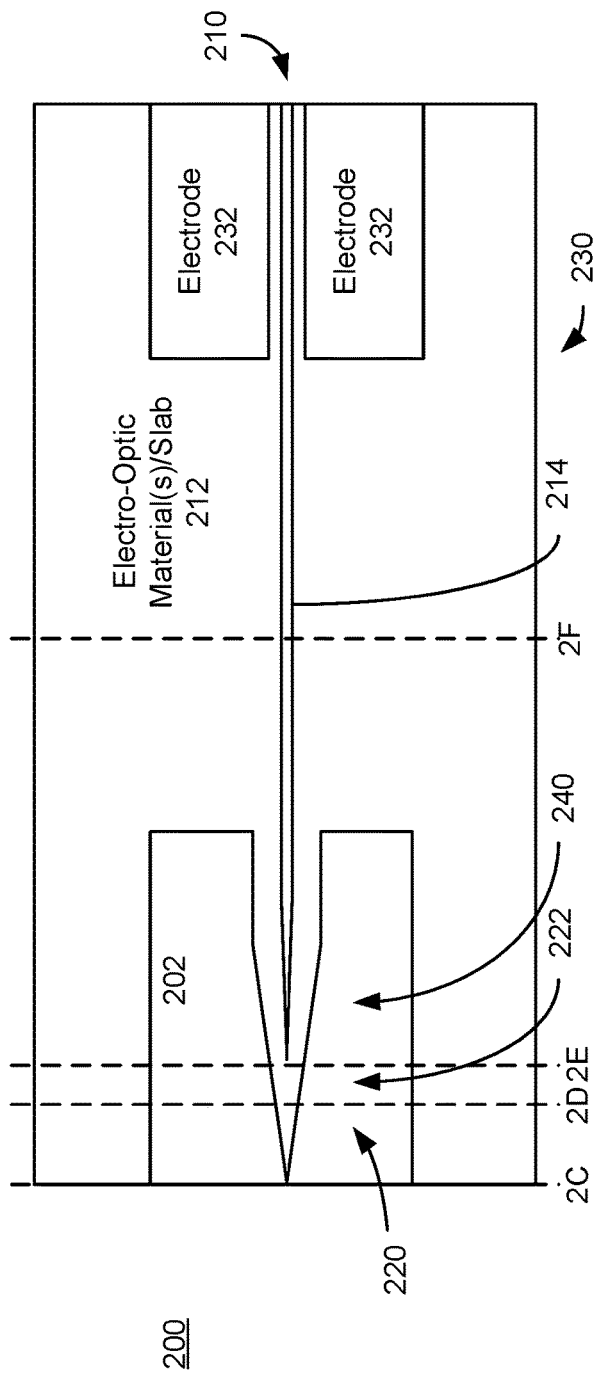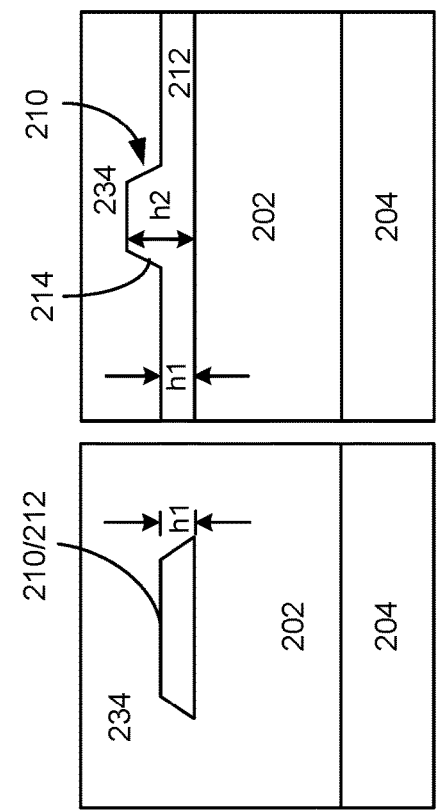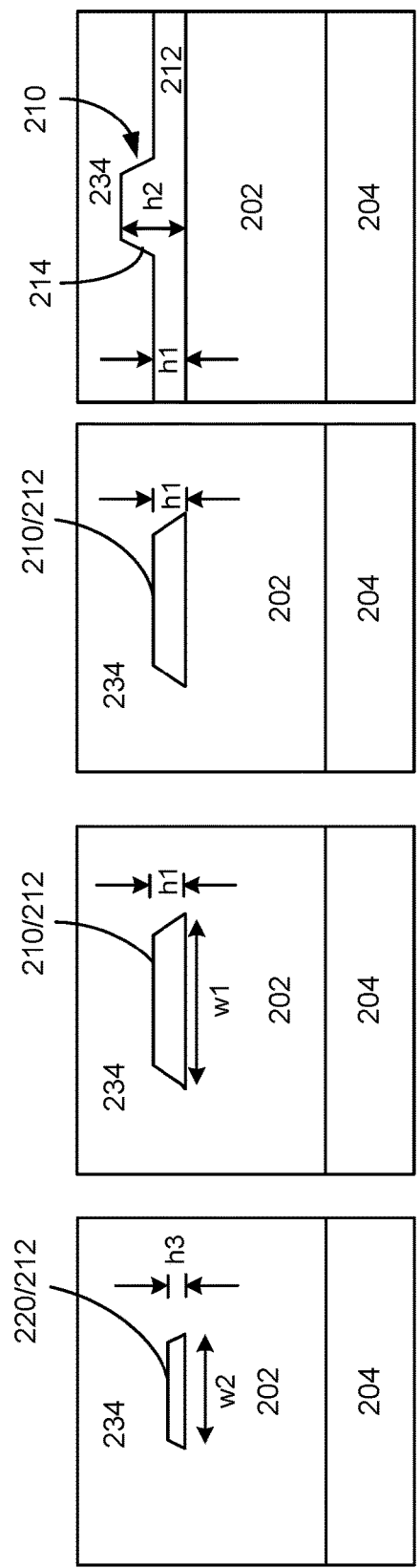

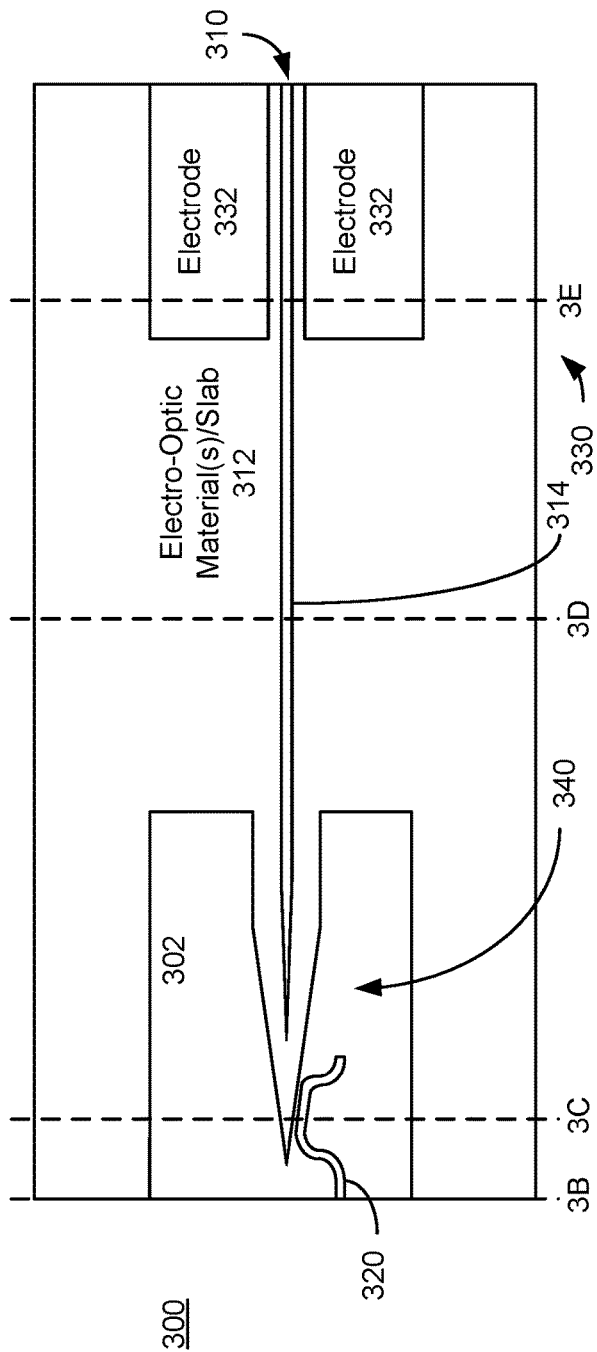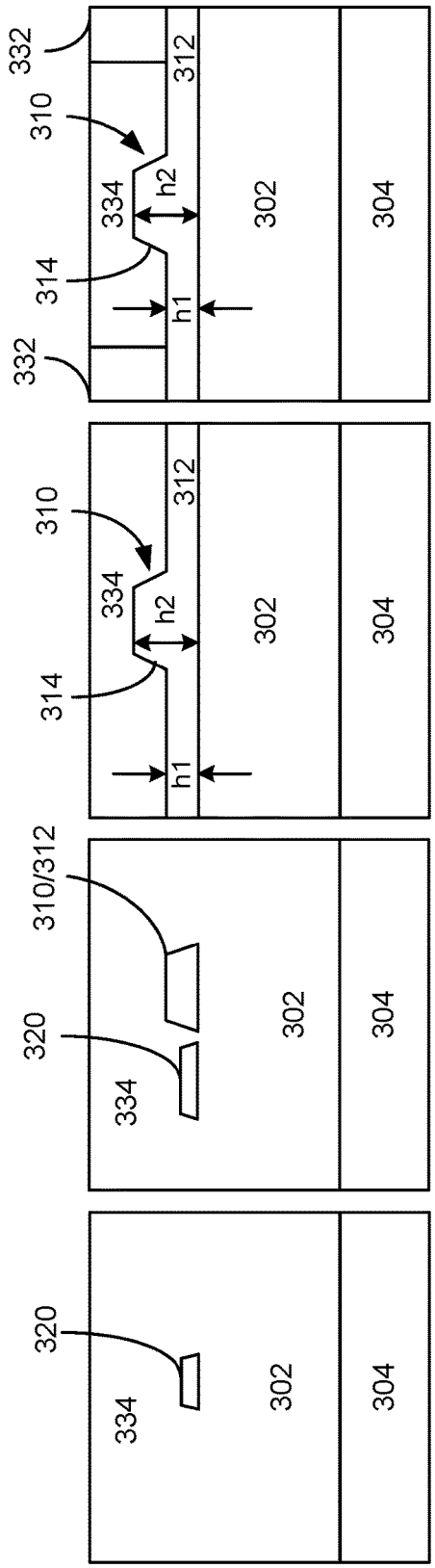
FIG. 3A
FIG. 3B
FIG. 3C
FIG. 3D
FIG. 3E

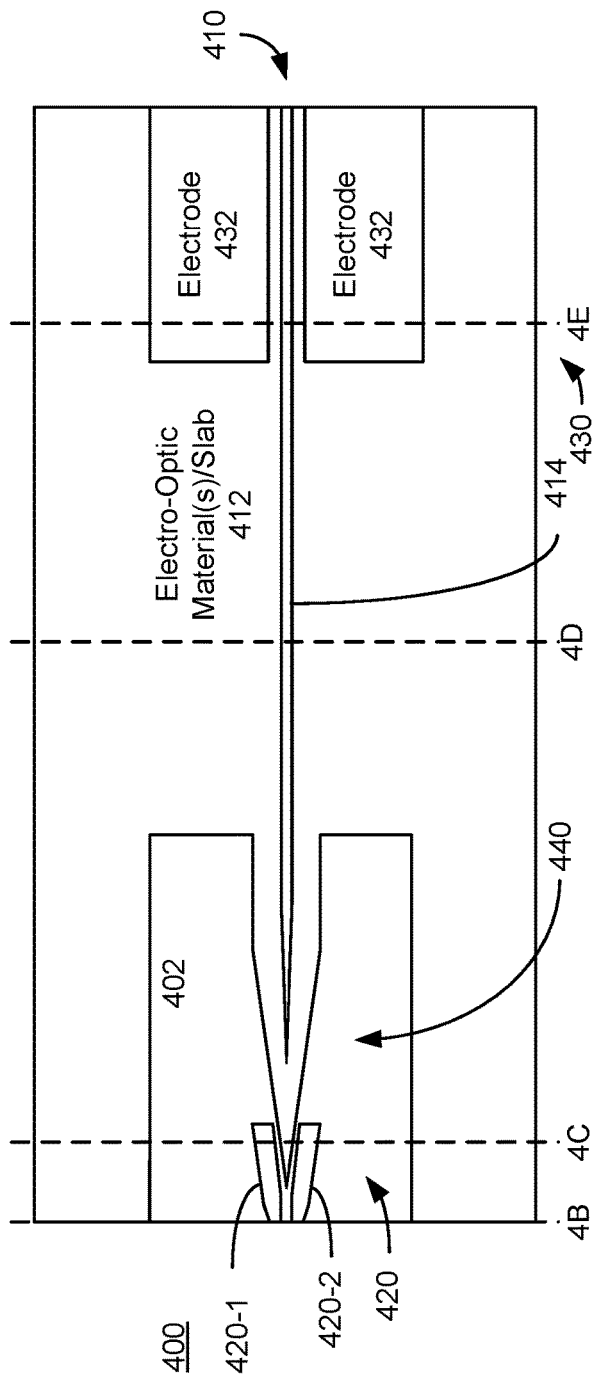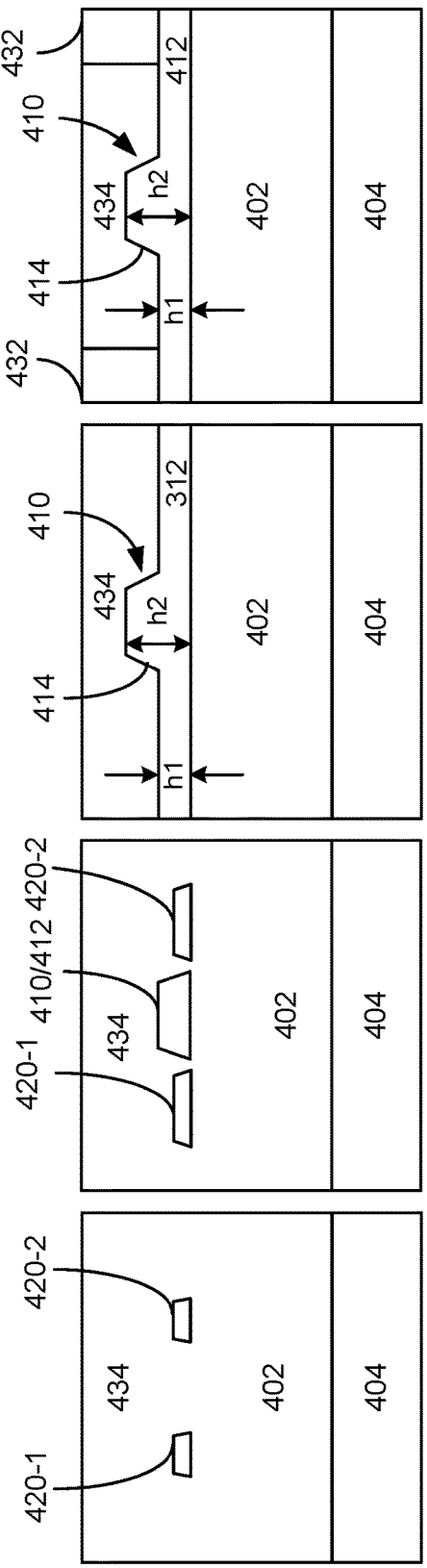

MODE CONVERTER

CROSS REFERENCE TO OTHER APPLICATIONS

This application claims priority to U.S. Provisional Patent Application No. 63/276,200 entitled MODE CONVERTER filed Nov. 5, 2021 which is incorporated herein by reference for all purposes.

BACKGROUND OF THE INVENTION

Optical fibers are often used to transmit optical signals to or from optical devices (e.g. electro-optic devices). The end of the optical fiber is aligned and optically coupled to a waveguide for the optical device at a facet (i.e. edge) of the substrate on which the optical device is fabricated. Once aligned and connected, optical signals can be transmitted between the waveguide and the optical fiber. However, optical fibers are frequently significantly larger in size than the waveguides used in optical components. Thus, the mode size for the optical signal is larger in the optical fiber than in the optical device. Because of this difference in size, alignment and efficient transmission of an optical signal between an optical device and an optical fiber may be challenging.

A mode converter may be used for addressing the mode size difference. A mode converter typically includes a waveguide having an inverse taper. Thus, the waveguide is narrower closer to the facet than further from the facet. As the waveguide narrows in proximity to the facet, the mode increases in size. Very close to the facet, the width of the waveguide for the mode converter may be constant. Although mode converters allow for coupling between optical devices and optical fibers, there may be significant drawbacks in integrating mode converters with electro-optic devices. Consequently, techniques for improving optical coupling between optical fibers and electro-optic devices are desired.

BRIEF DESCRIPTION OF THE DRAWINGS

Various embodiments of the invention are disclosed in the following detailed description and the accompanying drawings.

FIGS. 1A-1F depict an embodiment of an optical device including independently optimizable components.

FIGS. 2A-2F depict an embodiment of an optical device including independently optimizable components.

FIGS. 3A-3E depict an embodiment of an optical device including independently optimizable components.

FIGS. 4A-4E depict an embodiment of an optical device including independently optimizable components.

DETAILED DESCRIPTION

Figure 1A:
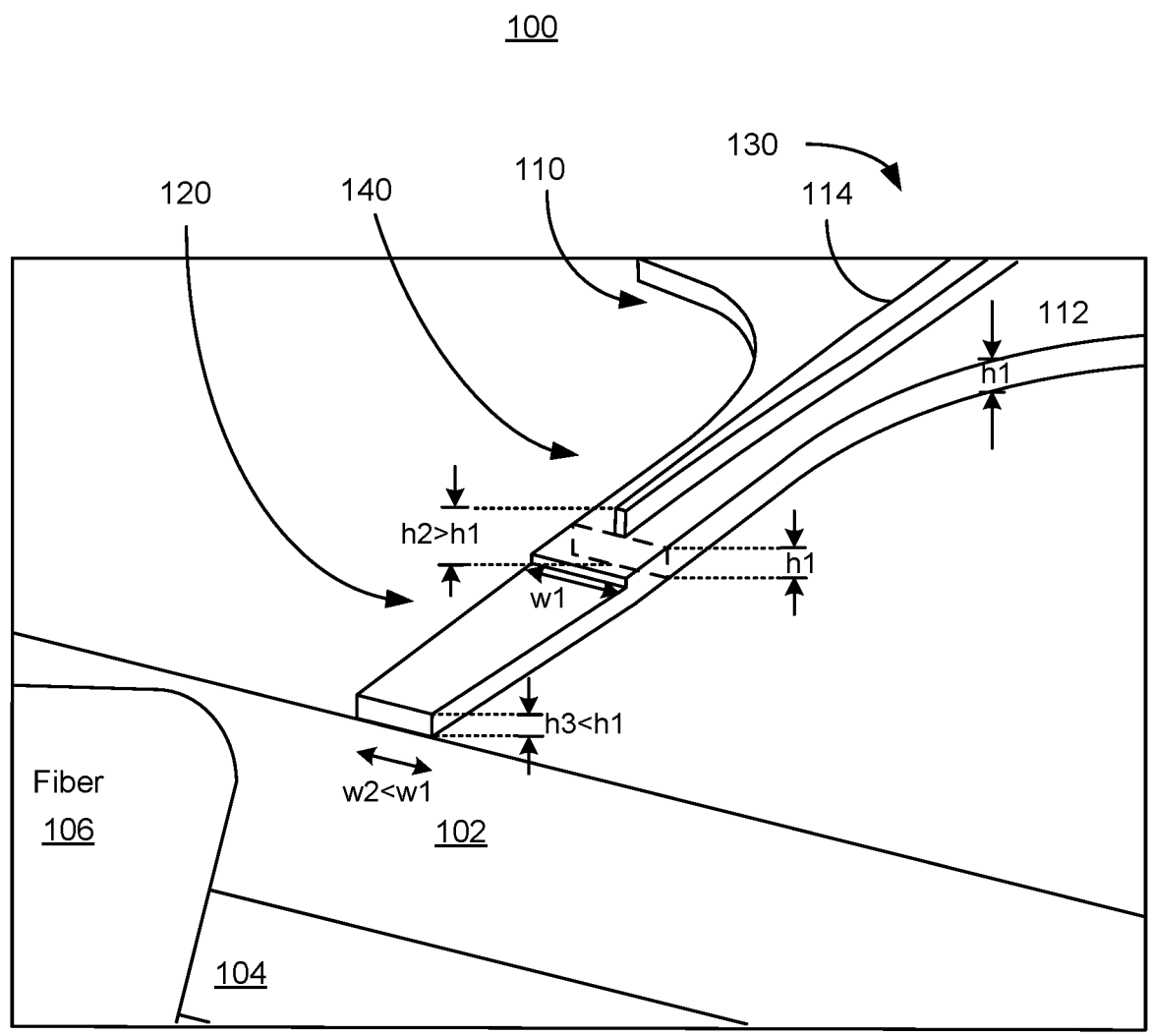

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In order to couple an optical signal into and out of a photonics integrated circuit, or optical device (e.g. an electro-optic device), optical fibers are often used. The end of the optical fiber is aligned and optically coupled with a waveguide at a facet for the integrated circuit. Optical signals can thus be transmitted between the waveguide and the optical fiber. However, the mode size for the optical signal in the optical fiber is significantly larger than the (generally highly confined) mode size for the waveguide of the optical device. Because of this difference in size, alignment and efficient transmission of an optical signal between an optical device and an optical fiber may be challenging. This difference in mode size can be addressed using a mode converter, which includes a waveguide having an inverse taper. Thus, the waveguide is narrower closer to the facet than further from the facet. The narrower portion of the waveguide closer to the facet has a larger (i.e. less confined) mode. Thus, the mode for the mode converter may be more readily aligned with the optical fiber.

Although mode converter can be used, there may be significant drawbacks. For example, electro-optic devices include both optical components (e.g. waveguides) and electrical components (e.g. electrodes). Electro-optic devices imprint an electric signal carried by the electrodes on an optical carrier signal (i.e. an optical signal) in the waveguide. Electro-optic devices are typically optimized to improve performance of the electro-optic device. For example, electro-optic devices are configured to enhance modulation of the optical signal over a given frequency range of the electrode signal. The mode converter is typically fabricated with and includes the same electro-optic material(s) as the electro-optic device. The desired configuration of the mode converter may be inconsistent with the desired geometry of the electro-optic device. Optimization of the mode converter may adversely affect performance of the electro-optic device, and vice versa. Consequently, techniques for improving optical coupling with electro-optic devices are desired.

An electro-optic device is described. The electro-optic device includes a ridge waveguide and a channel waveguide. The channel waveguide may be between the ridge waveguide and a facet of the photonics integrated circuit on which the electro-optic device resides. The ridge waveguide includes a first portion of at least one electro-optic material. The first portion of the electro-optic material(s) includes a slab and a ridge on the slab. The ridge has a ridge height, while the slab has a slab height less than the ridge height. The electro-optic device may also include electrodes near the ridge of the ridge waveguide. A portion of the slab is between the ridge and the electrodes.

The channel waveguide is optically coupled with the ridge waveguide and includes a second portion of the electro-optic material(s). The channel waveguide has a channel height less than the slab height. In some embodiments, the channel waveguide has a channel width that is less than the width of the slab of the ridge waveguide (and/or the width of the tapered region described below). In some embodiments, the channel waveguide also tapers such that the channel waveguide is narrower closer to the facet. The width of the channel waveguide distal from the ridge waveguide is not less than one hundred and fifty nanometers in some embodiments. Thus, the mode of an optical signal carried by the channel waveguide may be larger than the mode of an optical signal carried by the ridge waveguide. The width and/or height of the channel waveguide may be configured such that the channel waveguide may be readily optically coupled with an optical fiber having an optical mode field diameter of at least 2.5 micrometers (and at least three micrometers in some embodiments). The electro-optic material(s) used in the channel and ridge waveguides may include lithium niobate and/or lithium tantalate.

In some embodiments, the electro-optic device includes a tapered region. The tapered region includes a third portion of the electro-optic material(s) and couples the ridge waveguide with the channel waveguide. The ridge of the ridge waveguide may terminate in the tapered region. In some embodiments, the tapered region has a loss of not more than 1 dB. The channel waveguide may also be tapered such that the channel waveguide is narrower distal from the ridge waveguide. In some embodiments, the channel waveguide is adjacent to a portion of the taper. In some such embodiments, an additional channel waveguide adjacent to the channel waveguide is also provided. The additional channel waveguide may also have a channel height less than the slab height. In such embodiments, the channel waveguide and/or the additional channel waveguide may be formed of different optical (and/or electro-optic) materials than the ridge waveguide.

A transitional region may be provided between the ridge waveguide and the channel waveguide. The transitional region may also include the electro-optic material(s). Thus, the transitional region is optically coupled with the ridge and channel waveguides. The transitional region has a varying height that transitions between the slab height proximate to the ridge waveguide and the channel height proximate to the channel waveguide.

In some embodiments, passive functionality component(s) may also be present. Such passive functionality components are optically coupled with the channel waveguide and generally are between the channel waveguide and the ridge waveguide. The passive functionality component(s) have component height(s) that are at least the channel height and not greater than the slab height.

In some embodiments, therefore, the electro-optic device includes an optical modulator and a mode converter. The optical modulator includes the ridge waveguide and the electrodes. The mode converter includes the channel waveguide. The tapered region and/or the transitional region may couple the channel waveguide of the mode converter with the ridge waveguide of the optical modulator. Thus, the optical modulator and mode converter may be independently optimized.

A method for providing an electro-optic device is described. The method includes defining a ridge waveguide from electro-optic material(s). The ridge waveguide includes a slab and a ridge on the slab. The ridge has a ridge height that is greater than the slab height of the slab. In some embodiments, the ridge is defined from the electro-optic material(s) using a first etch (e.g. using a first etch process). The edges for the slab may be defined in a second etch (e.g. using a second etch process). The second etch may be considered to define the edges of the ridge waveguide. A channel waveguide is also provided in the electro-optic material(s). The channel waveguide is optically coupled with the ridge waveguide and has a channel height less than the slab height. In some embodiments, the sidewalls the channel waveguide are defined in the second etch. Thus, the second etch may also be used to taper the channel waveguide. The height of the channel waveguide may be defined in a third etch (e.g. using a third etch process). A tapered region and/or a transitional region may also be provided. The sidewalls of the tapered region may be defined in the second etch.

FIGS. 1A-1F depict an embodiment of optical device 100 including independently optimizable components. FIG. 1A depicts a perspective view of optical device 100. FIG. 1B depicts a plan view of optical device 100. FIGS. 1C, 1D, 1E, and 1F depict cross-sectional views of optical device 100 at locations 1C, 1D, 1E, and 1F depicted in FIG. 1B. For simplicity, only some portions of the device 100 are shown and FIGS. 1A-1F are not to scale.

Electro-optic device 100 includes ridge waveguide 110 and channel waveguide 120. Electro-optic device 100 may also be considered to include electro-optic component 130 that includes ridge waveguide 110 and electrodes 132. Electro-optic component 130 imprints an electric signal (e.g. carried by electrodes 132) onto an optical carrier (e.g. an optical signal transmitted by waveguide 112). In some embodiments, electro-optic component 130 is a modulator. Also shown in FIGS. 1C-1F is cladding 134, which has an index of refraction lower than the index of refraction of electro-optic material(s) used in ridge waveguide 110 and channel waveguide 120. A sufficiently large difference in the indices of refraction of ridge waveguide 110 and cladding 134 allows for the optical mode to be well confined by ridge waveguide 110. For example, cladding 134 may include or consist of silicon dioxide, while ridge waveguide 110 may include or consist of lithium niobate (LN) and/or lithium tantalate (LT)

In some embodiments, passive functionality component(s) (not shown) may be provided as part of electro-optic device 100. Such components may include components such as a polarization rotation beam splitter, a wavelength division multiplexer, a directional coupler, a compressive dispersive waveguide, linear mode converters, other optical couplers, other optical splitters, and/or other optical component(s). Such passive functionality components may be formed in slab 112. For example, such components may be in tapered region 140 and/or in a separate component between channel waveguide 120 and electro-optic component 130.

Electro-optic device 100 also includes tapered region 140 that may optically couple ridge waveguide 110 and channel waveguide 120. Ridge waveguide 110, channel waveguide 120, and electrodes 132 are shown as fabricated on substrate 102/104. Substrate 102/104 includes a high microwave dielectric constant layer 102 and a lower microwave dielectric constant layer 104. For example, high microwave dielectric constant layer 102 may be silicon dioxide, while low dielectric constant layer 104 may be silicon. Other substrates and/or layers, including a single layer substrate, may be used in some embodiments. Also depicted is optical fiber 106 to which channel waveguide 120 may be optically coupled at the facet of electro-optic device 100. In some embodiments, channel waveguide 120 is configured to be optically coupled to optical fiber 106 having a mode field diameter of at least 2.5 micrometers (e.g. three micrometers or more). However, optical fiber 106 may have other sizes. Channel waveguide 120 is in the optical path between ridge waveguide 110 and optical fiber 106 (or the facet of electro-optic device 100). In some embodiments, channel waveguide 120 is part of a mode converter.

Ridge waveguide 110 includes slab 112 and ridge 114 which is on (i.e. extends above) slab 112. In electro-optic device 100, channel waveguide 120 is formed from slab 112. Tapered region 140 narrows the width of slab 112 and ridge 114. In the embodiment shown, slab 112 and ridge 114 narrow and ridge 114 terminates in tapered region 140. Ridge waveguide 110, channel waveguide 120, and tapered region 140 each includes electro-optic material(s) in the embodiment depicted in FIGS. 1A-1F. In electro-optic device 100, ridge waveguide 110 (i.e. ridge 114 and slab 112), channel waveguide 120, and tapered region 140 are formed from the same electro-optic materials. In some embodiments, the electro-optic material(s) used in electro-optic device are nonlinear. As used herein, an electro-optic material exhibits the electro-optic effect and may have an effect that is at least (e.g. greater than or equal to) 5 picometer/volt. In some embodiments, the electro-optic material has an effect that is at least 10 picometer/volt. In some such embodiments electro-optic material has an effect of at least 20 picometer/volt. The electro-optic material experiences a change in index of refraction in response to an applied electric field. In some embodiments, the electro-optic material is ferroelectric. In some embodiments, the electro-optic material effect includes a change in index of refraction in an applied electric field due to the Pockels effect. Thus, in some embodiments, electro-optic materials possessing the electro-optic effect in one or more the ranges described herein are considered electro-optic materials regardless of whether the effect is linearly or nonlinearly dependent on the applied electric field. The electro-optic material may be a non-centrosymmetric material. Therefore, the electro-optic material may be piezoelectric. In some embodiments, the electro-optic material(s) include one or more of lithium niobate (LN), lithium tantalate (LT), potassium niobate, gallium arsenide, potassium titanyl phosphate, lead zirconate titanate, and barium titanate. In other embodiments, other electro-optic materials having analogous optical characteristics may be used.

Ridge 114 of ridge waveguide 110 is used to confine the mode of the optical signal transmitted by ridge waveguide 110. For example, the mode size for ridge 114 of ridge waveguide is indicated as 111F in FIG. 1F. Slab 112 is used to aid in concentrating the electric field from electrodes 132 at the portion of ridge waveguide 110 carrying the optical signal. Thus, slab 112 may be viewed as directing the electric field due to the electrical signals carried by electrodes 132 to the portion of ridge 114 between electrodes 132. In some embodiments, therefore, slab 112 may be present primarily between (and below) electrodes 132 and below ridge 114. In some such embodiments, slab 112 may also be present as part of channel waveguide 120. Thus, other configurations of slab 112 are possible. However, in order to facilitate processing, slab 112 may only be removed in particular desired regions, such as around channel waveguide 120 and tapered region 140.

Slab 112 has a slab height, $h_1$, while ridge 114 of ridge waveguide 110 has a ridge height, $h_2$. Although the slab height and ridge height may be in various ranges, the ridge height is greater than the slab height (i.e., $h_2 > h_1$). The ridge height $h_2$ may be not more than seven hundred nanometers. In some such embodiments, $h_2$ may be not more than six hundred nanometers. In some embodiments, $h_2$ is not more than five hundred nanometers. In some embodiments, $h_2$ is not more than four hundred and fifty nanometers. In some such embodiments, $h_2$ may be not more than (nominally) four hundred nanometers. In some embodiments $h_2$ is at least two hundred nanometers. For example, $h_2$ may be at least two hundred nanometers and not more than four hundred to four hundred fifty nanometers. In such embodiments, slab 112 may have a height, $h_1$, of not more than two hundred nanometers. In some embodiments, $h_1$ is not more than three hundred nanometers. In some such embodiments, the waveguide $h_1$ is not more than two hundred nanometers. In some embodiments, $h_1$ is not more than one hundred and fifty nanometers. In some embodiments, $h_1$ is at least fifty nanometers. In some such embodiments, $h_1$ is at least one hundred nanometers. In some embodiments, the slab height is at least one hundred fifty nanometers or at least two hundred nanometers. Slab height, $h_1$, is less than the ridge height $h_2$ of ridge 114. For example, the slab height may be not more than three hundred nanometers and at least one hundred and fifty nanometers for the ridge height being four hundred nanometers. Other slab heights and/or ridge heights are possible. In some embodiments, the slab height and ridge height for ridge waveguide 110 are configured to optimize performance of electro-optic component 130. For example, slab 112 and ridge 114 in (at least) the region of electrodes 132 may have a height and footprint to enhance modulation of the optical signal (e.g. concentrate the electric field from the electrical signal in electrodes 132 near ridge 114 and reduce $V\pi$) and reduce losses.

Channel waveguide 120 has a channel height, $h_3$, that is less than the height of slab 112 ($h_3 < h_1$). In the embodiment shown in FIGS. 1A-1F, the change in height between slab 112 in tapered region 140 (and/or ridge waveguide 110) and channel waveguide 120 is relatively abrupt and occurs at or very closer to the termination of ridge 114. This may be seen, for example, in FIGS. 1A and 1D. In other embodiments, the transition between heights may be accomplished in a different manner. For example, the transition may be located elsewhere (e.g. closer to the facet of electro-optic device 100) and/or may less abruptly. Channel waveguide 120 may have a channel height not exceeding three hundred nanometers (e.g. for $h_3 \leq 300$ nanometers for $h_1 > 300$ nanometers). Channel waveguide 120 may have a height of not more than 200 nanometers (e.g. for $h_3 \leq 200$ nanometers for $h_1 > 200$ nm). In some embodiments, waveguide 120 has a height of not more than 150 nanometers (e.g. for $h_3 \leq 150$ nanometers for $h_1 > 150$ nanometers). In some embodiments, waveguide 120 has a height of not more than 100 nanometers (e.g. for h3≤100 nanometers for h1>100 nanometers). In some embodiments, waveguide 120 has a height of not more than 50 nanometers (e.g. for h3≤50 nanometers for h1>50 nanometers). Similar relationships hold for the height of channel waveguide 120 being less than a particular value (e.g. h3<x for h2≥x).

Channel waveguide 120 may be independently optimized from ridge waveguide 110. In particular, the height h3 of channel waveguide 120 need not be the same as the height h2 of ridge 114 or height h1 of slab 112. As a result, channel waveguide 120 can provide a larger mode, such as mode 111C in FIG. 1C at larger widths (e.g. w2 shown in FIG. 1C) of channel waveguide 120. For example, width, w2, of channel waveguide 120 near the facet (shown in FIG. 1C) may be at least one hundred nanometers. In some embodiments, w2 is at least one hundred and fifty nanometers. Width w2 may be at least three hundred nanometers. In some embodiments, width w2 may be at least five hundred nanometers. In some such embodiments, the width w2 is at least one thousand nanometers. Channel waveguide 120 is also tapered in the embodiment shown. Thus, width, w1, near tapered region 140 (shown in FIG. 1D) is wider than the width at the facet (w1>w2) (shown in FIG. 1C). In other embodiments, channel waveguide 120 may not be tapered.

The thin film nonlinear optical material (e.g. LN and/or LT) may be fabricated for components 110, 120, and 130 utilizing photolithography. For example, ultraviolet (UV) and/or deep ultraviolet (DUV) photolithography may be used to pattern masks for the nonlinear optical material. For DUV photolithography, the wavelength of light used is typically less than two hundred and fifty nanometers. To fabricate components 110, 120, and 130, the thin film nonlinear optical material may undergo a physical etch, for example using dry etching, reactive ion etching (RIE), inductively coupled plasma RIE. In some embodiments, a chemical etch and/or electron beam etch may be used. The waveguide may thus have improved surface roughness. For example, the sidewall(s) may have reduced surface roughness. For example, the short range root mean square surface roughness of a sidewall of the ridge may be less than ten nanometers. In some embodiments, this root mean square surface roughness is not more than five nanometers. In some cases, the short range root mean square surface roughness does not exceed two nanometers. Consequently, components 110, 120, and 130 may have low losses. In some embodiments, the total optical loss (i.e., the difference between the sum of the optical input power on all inputs and the sum of all optical output power on all outputs when optical device 100 is configured for minimal losses) may be not more than 10 dB for an electrical signal having a frequency range of 50-100 GHz. In some embodiments, the total optical loss may be not more than 7 or 8 dB for the same frequency range. Individual components 110, 120, and 130 may thus also have low losses. For example, channel waveguide 120 may have losses of not more than 2 dB when utilized as a mode converter. In some such embodiments, waveguide 120 may have losses of not more than 1 dB. Further, the length of components 110, 120, and 130 may be sufficient for the desired purposes while maintaining such losses. For example, the portion of ridge waveguide 110 in proximity to electrodes 132 may be at least one or two centimeters for a Vπ of not more than 4.5 volts and total losses (total optical input power to electro-optic device 100 minus total optical output power from electro-optic device 100 at maximum transmission) of not more than 8 dB or 10 dB in the 50-100 GHz frequency range.

Thus, channel waveguide 120 may be provided with a different height than slab 112. As a result, channel waveguide 120 may be independently optimized from ridge waveguide 110 of electro-optic component 130. A smaller height allows channel waveguide 120 to increase the size of mode 111C while maintaining lower losses (e.g. losses not exceeding 1 or 2 dB). Further, fabrication of channel waveguide 120 is facilitated. Because channel waveguide 120 has a smaller height, the width of channel waveguide 120 may be increased over that of a thicker channel waveguide while providing the same increase in mode size. For example, for a channel waveguide having a height of two hundred nanometers (the same as the slab height, h1, in some cases), the width of such a channel waveguide proximate to the facet would be not more than approximately eighty nanometers. This is lower than the resolution of some DUV fabrication tools. Consequently, fabrication of such a structure is more challenging. For a channel height h3 of 150 nm or less, the width, w2, of channel waveguide 120 may be at least 150 nm in some embodiments. In some embodiments, w1 may be one thousand nanometers for h3 being less than 100 or 150 nanometers. These widths are well within the resolution of some DUV fabrication tools. Consequently, fabrication may be improved while low losses and a larger mode may be maintained. Thus, the heights of channel waveguide 120 and ridge waveguide 110 (e.g. slab 112) may be configured differently, allowing for independent optimization of components 120 and 130 and enhanced performance of electro-optic device 100. Thus, performance of multiple components of electro-optic device 100 may be improved.

Figure 2A:
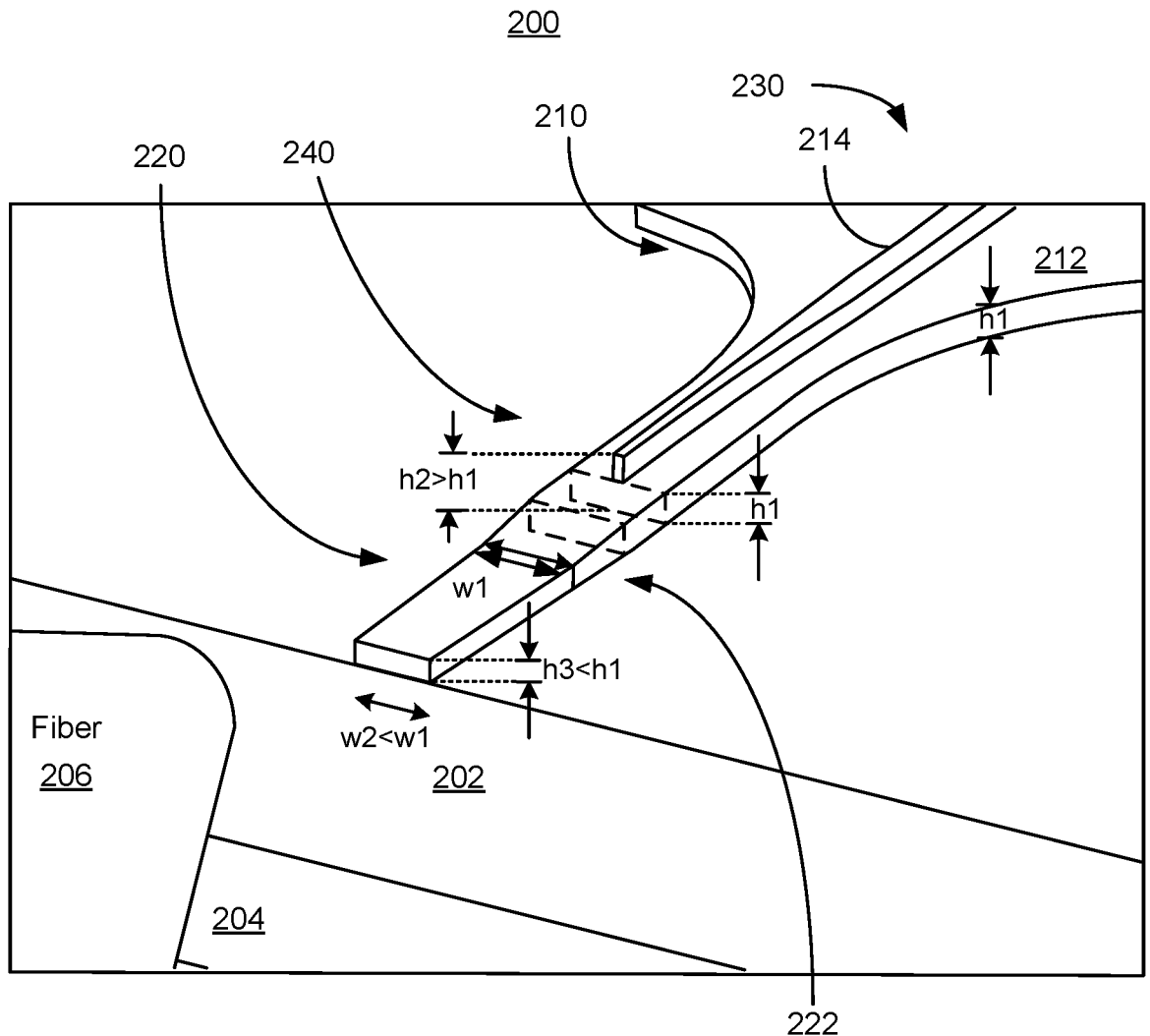

FIGS. 2A-2F depict an embodiment of optical device 200 including independently optimizable components. FIG. 2A depicts a perspective view of optical device 200. FIG. 2B depicts a plan view of optical device 200. FIGS. 2C, 2D, 2E, and 2F depict cross-sectional views of optical device 200 at locations 2C, 2D, 2E, and 2F depicted in FIG. 2B. For simplicity, only some portions of the device 200 are shown and FIGS. 2A-2F are not to scale.

Electro-optic device 200 is analogous to electro-optic device 100. Electro-optic device 200 thus includes ridge waveguide 210 including slab 212 and ridge 214, channel waveguide 220, electro-optic component 230 including ridge waveguide 210 and electrodes 232, tapered region 240, substrate 202/204, and cladding 234 that are analogous to ridge waveguide 110 including slab 112 and ridge 114, channel waveguide 120, electro-optic component 130 including ridge waveguide 110 and electrodes 132, tapered region 140, substrate 102/104, and cladding 134, respectively.

In addition, electro-optic device 200 includes transition region 222. As can be seen in FIGS. 2A, 2D, and 2C, in transition region 222, the height of slab 212 goes from h1 to h3 (the height of channel waveguide 220) smoothly. Although the height of channel waveguide 220 is depicted as being constant, in some embodiments, transition region 222 overlaps some or all of channel waveguide 220. For example, the height may change smoothly from at or near termination or ridge 214 to at or near the facet of electro-optic device 200. Transition region 222 may be considered part of tapered region 240 (or part of channel waveguide 220). Thus, the width of electro-optic material may also decrease. Thus, the height of the structures fabricated in slab 212 may change more smoothly than in electro-optic device 100.

Electro-optic device 200 may share the benefits of electro-optic device 100. Channel waveguide 220 may be provided with a different height than slab 212. As a result, channel waveguide 220 may be independently optimized from ridge waveguide 210 of electro-optic component 230. A smaller height allows channel waveguide 220 to increase the size of the mode while maintaining lower losses (e.g. losses not exceeding 1 or 2 dB). Further, fabrication of channel waveguide 220 is facilitated. Because channel waveguide 220 has a smaller height, its width may be increased while providing the same performance. Consequently, fabrication may be improved while low losses and a larger mode may be maintained. Thus, the heights of channel waveguide 220 and ridge waveguide 210 (e.g. slab 212) may be configured differently, allowing for independent optimization of components 220 and 230 and enhanced performance of electro-optic device 200.

FIGS. 3A-3E depict an embodiment of optical device 300 including independently optimizable components. FIG. 3A depicts a plan view of optical device 300. FIGS. 3B, 3C, 3D, and 3E depict cross-sectional views of optical device 300 at locations 3B, 3C, 3D, and 3E depicted in FIG. 3A. For simplicity, only some portions of the device 300 are shown and FIGS. 3A-3E are not to scale.

Electro-optic device 300 is analogous to electro-optic device(s) 100 and/or 200. Electro-optic device 300 thus includes ridge waveguide 310 including slab 312 and ridge 314, electro-optic component 330 including ridge waveguide 310 and electrodes 332, tapered region 340, and cladding 334 that are analogous to ridge waveguide 110 including slab 112 and ridge 114, electro-optic component 130 including ridge waveguide 110 and electrodes 132, tapered region 140, and cladding 134, respectively.

In electro-optic device 300, however, channel waveguide 320 is not formed from the slab 312. Instead, channel waveguide 320 is separately fabricated. Thus, channel waveguide 320 may be formed of different optical materials than slab 312. For example, channel waveguide 320 may be formed of another low index of refraction material such as SiN, SiON, and/or SU8, while slab 312 may be formed of LN and/or LT. As indicated in FIG. 3C, channel waveguide 320 may be adjacent to a portion of slab 312 in tapered region 340. In other embodiments, channel waveguide 320 may be located in other regions for which channel waveguide 312 can be optically coupled with tapered region 340. For example, in some embodiments, channel waveguide 320 resides on tapered region 340. As shown in FIGS. 3B and 3C, the height of channel waveguide 320 is less than the slab height of slab 312. Channel waveguide 320 may have the same or different widths from channel waveguides 120 and/or 220. If a low index of refraction material is used for channel waveguide 320, the tip of channel waveguide 320 may be larger than the DUV resolution limit. For example, the tip of channel waveguide 320 may still be at least 150 nanometers wide.

Electro-optic device 300 may share the benefits of electro-optic device(s) 100 and/or 200. Channel waveguide 320 may be provided with a different height than slab 312 and/or be formed using different material(s). As a result, channel waveguide 320 may be independently optimized from ridge waveguide 310 of electro-optic component 330. Thus, a larger mode may be supported by channel waveguide 320 while allowing for lower losses and an electro-optic device 330 having a geometry, performance and fabrication that are separately optimized. Thus, performance and fabrication of electro-optic device 300 may be improved.

FIGS. 4A-4E depict an embodiment of optical device 400 including independently optimizable components. FIG. 4A depicts a plan view of optical device 400. FIGS. 4B, 4C, 4D, and 4E depict cross-sectional views of optical device 400 at locations 4B, 4C, 4D, and 4E depicted in FIG. 4A. For simplicity, only some portions of the device 400 are shown and FIGS. 4A-4E are not to scale.

Electro-optic device 400 is analogous to electro-optic device(s) 100, 200 and/or 300. Electro-optic device 400 thus includes ridge waveguide 410 including slab 412 and ridge 414, electro-optic component 430 including ridge waveguide 410 and electrodes 432, tapered region 440, and cladding 434 that are analogous to ridge waveguide 110 including slab 112 and ridge 114, electro-optic component 130 including ridge waveguide 110 and electrodes 132, tapered region 140, substrate 102/104, and cladding 134, respectively.

In electro-optic device 400, however, two channel waveguides 420-1 and 420-2 (collectively or generically 420) are not formed from the slab 412. Instead, channel waveguides 420 are separately fabricated. Thus, channel waveguides 420 may be formed of different optical materials than slab 412. As indicated in FIG. 4C, channel waveguides 420 are adjacent to a portion of slab 412 in tapered region 340. Channel waveguides 420 and the tip of slab 412 may be considered to form a trident structure (i.e. three waveguides). In other embodiments another number of waveguides (e.g. two or four) might be used. In some embodiments, channel waveguides 420 may each have a height that is less than the slab height of slab 412. Channel waveguides 420 may have the same or different widths from channel waveguides 120 and/or 220. If a low index of refraction material is used for channel waveguides 420, the tip of channel waveguides 420 may be larger than the DUV resolution limit. For example, the tip of each channel waveguide 420 may still be at least 150 nanometers wide.

Electro-optic device 400 may share the benefits of electro-optic device(s) 100, 200, and/or 300. Channel waveguide 420 may be provided with a different height than slab 412 and/or be formed using different material(s). As a result, channel waveguides 420 may be independently optimized from ridge waveguide 410 of electro-optic component 430. Thus, a larger mode may be supported by channel waveguide 420 while allowing for lower losses and an electro-optic component 430 having a geometry, performance and fabrication that are separately optimized. Thus, performance and fabrication of electro-optic device 400 may be improved.

Figure 5:
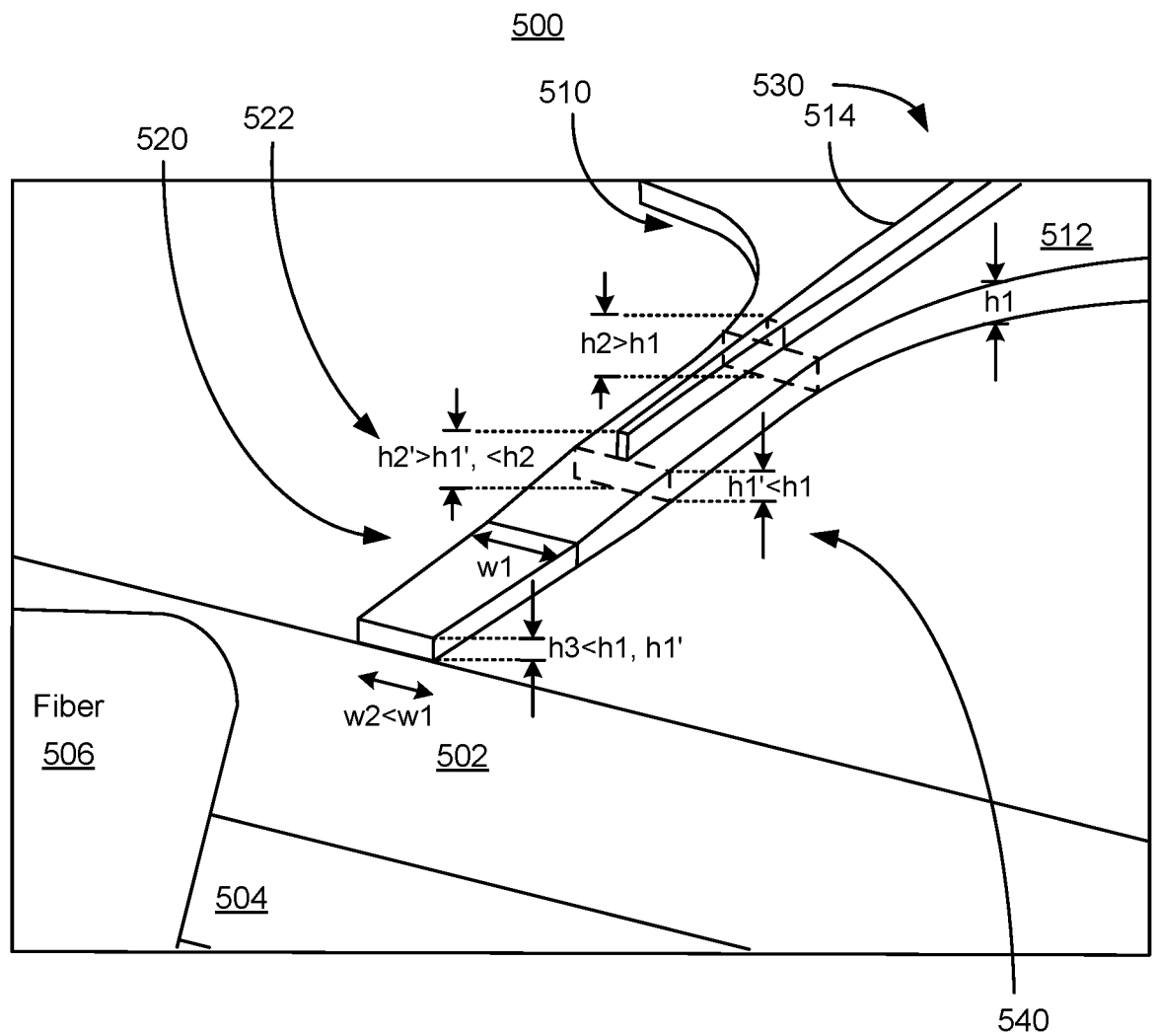
FIG. 5 depicts an embodiment of an optical device including independently optimizable components.

FIG. 5 depicts a perspective view of an embodiment of optical device 500 including independently optimizable components. For simplicity, only some portions of the device 500 are shown and FIG. 5 is not to scale. Electro-optic device 500 is analogous to electro-optic device(s) 100 and/or 200. Electro-optic device 500 thus includes ridge waveguide 510 including slab 512 and ridge 514, channel waveguide 520, electro-optic component 530 including ridge waveguide 510 and electrodes (not shown in FIG. 5), tapered region 540, transition region 522, substrate 502/504, and cladding (not shown) that are analogous to ridge waveguide 210 including slab 212 and ridge 214, channel waveguide 220, electro-optic component 230 including ridge waveguide 210 and electrodes 232, tapered region 240, transition region 222, substrate 202/204, and cladding 234, respectively.

In the embodiment shown, transition region 522 may be considered to extend over part of tapered region 540. Thus, both the height and width of ridge 514 and slab 512 are varied. Thus, ridge height transitions from h2 to h2' (h2'<h2, h2'>h1') before ridge 514 terminates. Similarly, slab 512 transitions from slab height h1 to h1' (h1'<h1) over the same region. The height of slab 512 is reduced to h3 in transition region 522. The height of slab 512 goes from h1 to h1' and from h1' to h3 (the height of channel waveguide 520) smoothly. Although the height of channel waveguide 520 is depicted as being constant, in some embodiments, transition region 522 overlaps some or all of channel waveguide 520. For example, the height may change smoothly from h1 to h3 at or near the facet of electro-optic device 500. The width of the electro-optic material may also decrease in tapered region 540, transition region 522, and channel waveguide 520. In addition, in transition region 522 or another portion of electro-optic device 500, a passive optical component (not explicitly depicted) might be implemented. For example, the changes the width of slab 512 in this region might be used to form a polarization rotation beam splitter and/or other passive component.

Electro-optic device 500 may share the benefits of electro-optic device 100, 200, 300, and/or 400. Consequently, different components 520 and 530 may be separately optimized. As a result, fabrication and/or performance of one or both components 520 and/or 530 may be improved.

Figure 6:
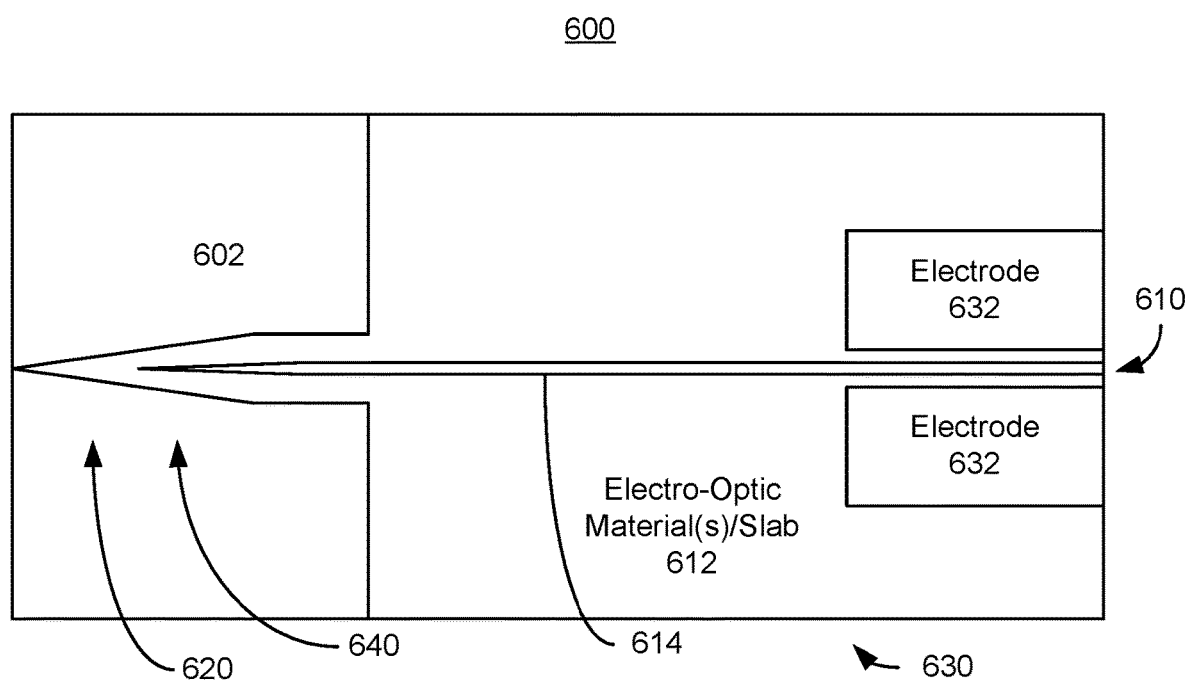
FIG. 6 depicts an embodiment of an optical device including independently optimizable components.

FIG. 6 is a plan view of an embodiment of optical device 600 including independently optimizable components. For simplicity, only some portions of the device 600 are shown and FIG. 6 is not to scale. Electro-optic device 600 is analogous to electro-optic device(s) 100, 200, 300, 400, and/or 500. Electro-optic device 600 thus includes ridge waveguide 610 including slab 612 and ridge 614, channel waveguide 620, electro-optic component 630 including ridge waveguide 610 and electrodes 632, tapered region 640, substrate 602, and cladding (not shown) that are analogous to ridge waveguide 210 including slab 212 and ridge 214, channel waveguide 220, electro-optic component 230 including ridge waveguide 210 and electrodes 232, tapered region 240, transition region 222, substrate 202/204, and cladding 234, respectively.

In the embodiment shown, slab 612 has been further etched away from the facet of electro-optic device 600. Underlying substrate layer 602 has been further exposed. Thus, various configurations of slab 612 might be present in a given electro-optic device. Electro-optic device 600 may share the benefits of electro-optic device(s) 100, 200, 300, 400, and/or 500. Consequently, different components 620 and 630 may be separately optimized. As a result, fabrication and/or performance of one or both components 620 and/or 630 may be improved.

Figure 7A:
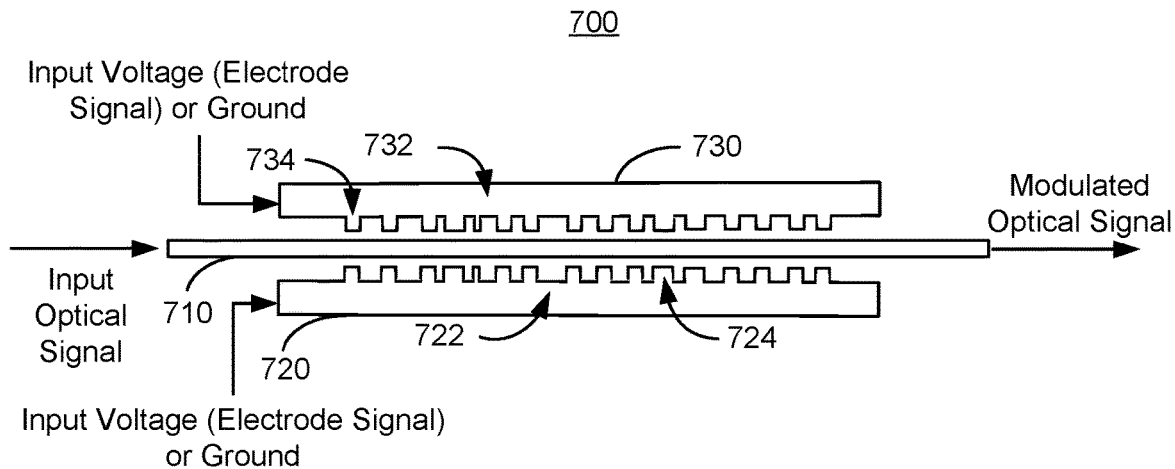
FIGS. 7A-7B depict an embodiment of an optical device having engineered electrodes.
Figure 7B:
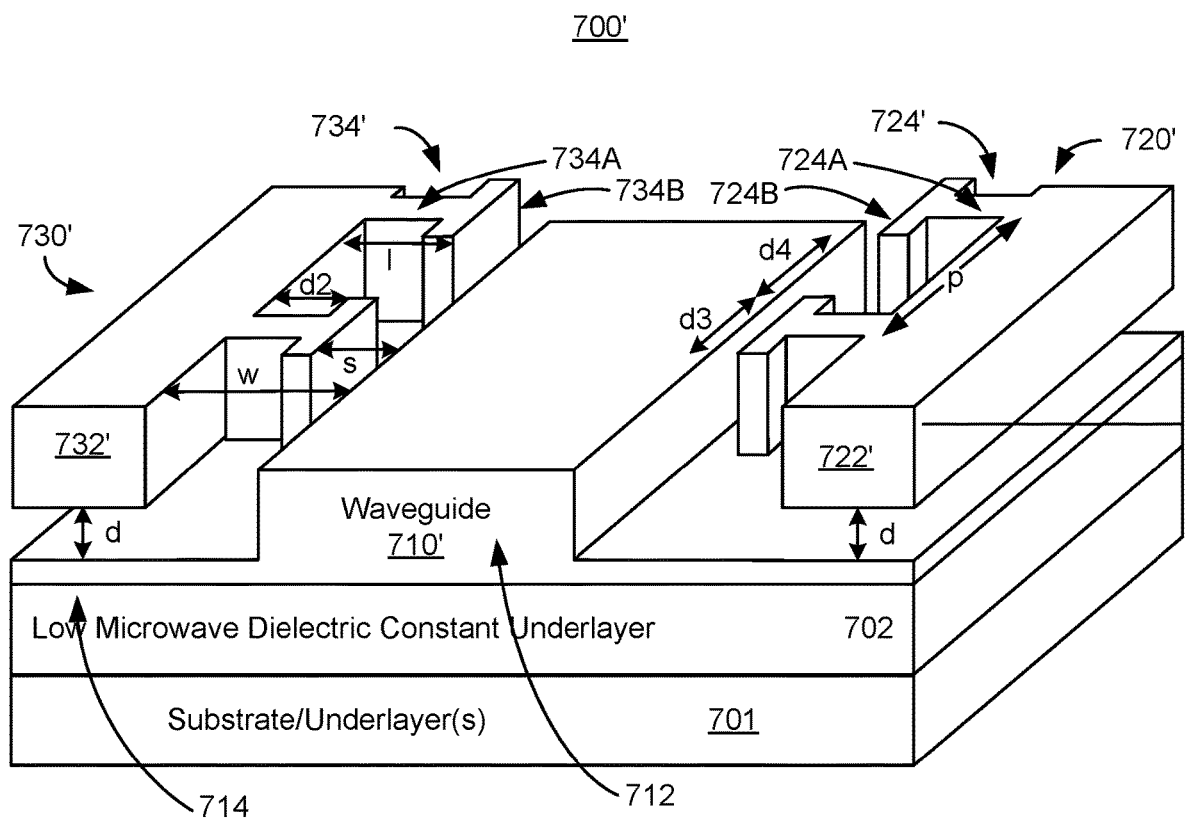

7A-7B depict embodiments of a portion of optical devices 700 and 700'. FIG. 7A depicts a plan view of optical device (i.e. electro-optic device) 700 including waveguide 710 and electrodes 720 and 730. FIG. 7B depicts a perspective view of optical device 700' which is analogous to optical device 700. In particular FIGS. 7A and 7B depict portions of the waveguide and electrode(s) that may be used in one or more of optical devices 100, 200, 300, 400, 500, and/or 600.

Optical devices 700 and 700' may be part of an optical modulator or other devices with an electro-optic response (e.g. in picometers per volt) in the thin film plane (e.g. x-cut or y-cut lithium niobate) or perpendicular to the thin film plane. In other embodiments, an optical device may be part of an optical modulator with an electro-optic response (e.g. in picometers per volt) out of plane of the thin film plane (e.g. z-cut lithium niobate). Optical devices may be part of an optical transceiver, such as optical transceiver 185.

Referring to FIG. 7A, optical device 700 includes waveguide 710 and electrodes 720 and 730. Waveguide 710 is used to transmit an optical signal. More specifically, waveguide 710 receives an input optical signal and outputs a modulated optical signal. Electrode(s) 720 and/or 730 carry an electrode signal that applies a time varying electric field to waveguide 710. This electric field alters the index of refraction of waveguide 710. In some embodiments, electrode 720 carries an electrode signal, such as a microwave signal, while electrode 730 is a ground. In some embodiments, electrode 730 carries an electrode (e.g. microwave) signal, while electrode 720 is ground. In some embodiments, both electrodes 720 and 730 carry electrode signals. Other configurations are also possible. Thus, electrodes 720 and 730 combine with waveguide 710 to provide a modulated optical signal. Electrodes 720 and 730 are drawn around waveguide 710 to indicate that waveguide 710 experiences an applied electric field between 720 and 730, but does not indicate the physical locations of electrode 720 and 730. For example, it is possible to have electrode 720 directly on top or below the waveguide while 730 is on one side.

Waveguide 710 is depicted as a having a rectangular footprint and extending only between electrodes 720 and 730. Waveguide 710 may have other configurations. For example, waveguide 710 may include a thin film portion that may extend under electrode(s) 720 and/or 730 and a ridge 712 between electrodes 720 and 730. Waveguide 710 includes at least one optical material possessing an electro-optic effect as described above and may include LN and/or LT.

In some embodiments, waveguide 710 is a low optical loss waveguide. For example, waveguide 710 may have a total optical losses described above with respect to FIG. 1. In some embodiments, the nonlinear optical material for waveguide 710 consists of LN. In some embodiments, the nonlinear optical material for waveguide 710 consists of LT. Such nonlinear optical materials may have inert chemical etching reactions for conventional etching using chemicals such as fluorine, chlorine or bromine compounds. In some embodiments, the nonlinear optical material(s) include one or more of LN, LT, potassium niobate, gallium arsenide, potassium titanyl phosphate, lead zirconate titanate, and barium titanate. In other embodiments, other nonlinear optical materials having analogous optical characteristics may be used. Waveguide 710 may also have an analogous geometry (e.g. thicknesses, lengths, and/or widths) to those described for waveguides in optical channels 110.

Various other optical components may be incorporated into waveguide 710 to provide the desired phase modulation, polarization modulation, intensity modulation, IQ modulation, other modulation and/or other functionality. For example, waveguide 710 may have wider portion(s) (not shown in FIG. 7A) for accommodating multiple modes and narrower portions for coupling to optical fibers. In some embodiments (not shown in FIG. 7A), waveguide 710 may include splitters to divide the optical signal into multiple branches for modulation and recombine the modulated optical signals for output. Thus, waveguide 710, as well as electrodes 720 and 730, may be configured to provide the desired functionality.

A portion of waveguide 710 is proximate to electrodes 720 and 730 along the direction of transmission of the optical signal (e.g. from the input of the optical signal through waveguide 710 to the modulated optical signal output). This portion of the waveguide may have a variety of lengths. In some embodiments, the portion of waveguide 710 close to electrodes 720 and 730 is at least two millimeters in length. In some embodiments, this portion of waveguide 710 is at least five millimeters and not more than ten millimeters long. Other embodiments may have this portion of the waveguide 710 longer. The portion of waveguide 710 proximate to electrodes 720 and 730 may have a length greater than two centimeters. In some embodiments, the length of the portion of waveguide 710 proximate to electrodes 720 and 730 is at least 2.5 cm. In some embodiments, the length of this portion of waveguide 710 is at least three centimeters. Such lengths are possible at least in part because of the low optical losses per unit length for waveguide 710 described above. Because waveguide 710 can be made longer, the total optical modulation may be provided through the electric field generated by electrodes 720 and 730 may be larger. Further, because of the low optical losses and low microwave losses (described below), the desired optical modulation (e.g. change in index of refraction) may be achieved with a signal input to the electrode(s) 720 and/or 730 having a lower voltage. For example, V$\pi$ is the half wave voltage, or the amplitude of the input electrode signal required to shift the phase of the optical signal by $\pi$. In some embodiments, V$\pi$ is not more than six volts for electrode signals in the 50-100 GHz range. In some embodiments, V$\pi$ is not more than 7.5 volts for electrode signals in the 50-100 GHz range. In some embodiments, V$\pi$ is not more than three volts for signals in the 50-100 GHz range. In some embodiments, V$\pi$ is on the order of voltages provided via CMOS circuitry, for example in the range of 0.5 volts through 4.5 volts for signals in the 50-100 GHz range. For example, V$\pi$ may be not more than 4.5 volts at ten GHz. Thus, V$\pi$ is not more than 4.5 volts in some embodiments. In some such embodiments, V$\pi$ is not more than 4 volts for signals in the 50-100 GHz range. Other voltages for other frequency ranges are possible. Thus, performance of optical modulator 710 may be improved.

Further, the portion of waveguide 710 proximate to electrodes 720 and 730 may have an optical mode cross-sectional area that is small. In some embodiments, the optical mode cross-sectional area is less than 3 multiplied by the square of the wavelength of the optical signal in the nonlinear optical material(s) (e.g. 22). In some embodiments, the optical mode cross-sectional area is less than 2 multiplied by the square of the wavelength of the optical signal in the nonlinear optical material(s). In some embodiments, the optical mode cross-sectional area is less than 4.5 multiplied by the square of the wavelength of the optical signal in the nonlinear optical material(s). In some embodiments, the optical mode cross-sectional area is less than 4 $\mu m^2$. In some such embodiments, the optical mode cross-sectional area is not more than 3 $\mu m^2$. In some embodiments, such a small optical mode cross-sectional area may be provided using thin films and fabrication technologies described herein. The optical mode cross-sectional area may also allow for the low optical losses described herein.

Electrodes 720 and 730 apply electric fields to waveguide 710. Electrode 720 includes a channel region 722 and extensions 724 (of which only one is labeled in FIG. 7A). Electrode 730 includes a channel region 732 and extensions 734 (of which only one is labeled in FIG. 7A). In some embodiments, extensions 724 and/or 734 may be omitted from electrode 720 and/or electrode 730, respectively. Extensions 724 and 734 protrude from channel regions 722 and 732, respectively. Thus, extensions 724 and 734 are closer to waveguide 710 than channel region 722 and 732, respectively, are. Extensions 724 and 734 shown in FIG. 7A are simple rectangular protrusions. In some embodiments, extensions 724 and 734 may have a different shape. For example, extension(s) 724 and/or 734 may have an L-shaped footprint, a T-shaped footprint and/or another shaped footprint. Regardless of the shape, at least part of each of the extensions 724 and 734 is closer to waveguide 710 than channel regions 722 and 732, respectively. The distribution (e.g. pitch) and width of extensions 724 and 734 are also irregular. In some embodiments, the distribution and/or width of extensions 724 and/or 734 may be regular. The distance between waveguide 710 and extensions 724 and 734 is shown as constant. In some embodiments, this distance may vary. Similarly, the distance between waveguide 710 and channel 722 and 732 is shown as constant. In some embodiments, this distance may vary. Electrodes 720 and 730 are shown as symmetric. In some embodiments, electrodes 720 and 730 are asymmetric. For example, extensions 734 may be omitted, while extensions 724 are present.

Extensions 724 and 734 protrude from channel regions 722 and 732, respectively, and reside between channel regions 722 and 732, respectively, and waveguide 710. As a result, extensions 724 and 734 are sufficiently close to waveguide 710 to provide an enhanced electric field at waveguide 710. Consequently, the change in index of refraction induced by the microwave signal carried in electrodes 720 and/or 730 is increased. In contrast, channel regions 722 and 732 are spaced further from waveguide 710 than the extensions 724 and 734. Thus, channel region 722 is less affected by the electric field generated by electrode 730/ extensions 734. Electrical charges have a reduced tendency to cluster at the edge of channel region 722 closest to electrode 730. Consequently, current is more readily driven through central portions channel region 722 and the electrode losses in channel region 722 (and electrode 720) may be reduced. Similarly, channel region 732 is further from electrode 720. Channel region 732 is less affected by the electric field generated by electrode 720/extensions 724. Electrical charges have a reduced tendency to cluster at the edge of channel region 732 closest to electrode 720. Consequently, current is more readily driven through channel region 732 and the electrode losses in channel region 732 (and electrode 730) may be reduced. Because microwave signal losses through electrodes 720 and 730 may be reduced, a smaller driving voltage may be utilized for electrode(s) 720 and/or 730 and less power may be consumed by optical device 700. In addition, the ability to match the impedance of electrode 720 with an input voltage device (not shown in FIG. 7A) may be improved. Such an impedance matching may further reduce electrode signal losses for optical device 700. Moreover, extensions 724 and 734 may affect the speed of the electrode signal through electrodes 720 and 730. Thus, extensions 724 and 734 may be configured to adjust the velocity of the electrode signal to match the velocity of the optical signal in waveguide 710. Consequently, performance of optical device 700 may be improved.

Electrode(s) 720 and/or 730 may be fabricated using deposition techniques, such as evaporation and/or electroplating, and photolithography to shape extensions 724 and/ or 734 of electrode 720 and/or 730. The resulting electrode 720 and/or 730 may have a lower frequency dependent electrode loss. In some embodiments, the frequency dependent electrode power loss for a particular frequency window (e.g. at least 40 GHZ) in a frequency range between DC and five hundred GHz can be as low as 0.8 dB per square root of the electrode signal frequency per centimeter, where the electrode signal frequency is measured in GHz. The frequency dependent electrode loss is less than 0.5 dB per square root of an electrode signal frequency per centimeter in other embodiments. The electrode signal frequency is measured in GHz and the frequency window may be at least 40 GHz. The frequency dependent electrode loss is less than 0.3 dB per square root of an electrode signal frequency per centimeter in other embodiments. The electrode signal frequency is measured in GHz and the frequency window may be at least 40 GHz. In some embodiments, the electrode has an absorption electrode loss for a frequency window in an electrode signal frequency from DC to not more than five hundred GHz. The absorption electrode loss is less than 0.005 dB per GHz per centimeter and the frequency window is at least 40 GHz in some embodiments. In some embodiments, the frequency dependent electrode power loss for the same frequency window and frequency range can be as low as 0.75 dB per square root of the electrode signal frequency per centimeter for the particular frequency window (e.g. 40 GHz or more). In some embodiments, the electrode has an absorption electrode loss. In some embodiments, the absorption electrode loss a particular frequency window (e.g. 40 GHz or more) in a frequency range between DC and five hundred GHz is less than 0.02 dB per GHz per centimeter. In some embodiments, the absorption electrode loss for the same frequency window and frequency range is less than 0.005 dB per GHz per centimeter for the frequency window in the frequency range of DC and five hundred GHz. In some embodiments, optical device 700 may include an additional electrode, such as a DC electrode (not shown in FIG. 7A). Such an additional electrode may be used to optimize optical device 700 for low-frequency response. This electrode may include one or more of an electro-optic, a thermal phase shifter and or MEMS shifter.

In operation, an optical signal that is desired to be modulated is input to waveguide 710. An electrode signal, e.g. a microwave signal, is also applied to electrode(s) 720 and/or 730. For the purposes of explanation, it is assumed that the microwave signal is applied to electrode 720, while electrode 730 is ground. The time varying microwave signal through electrode 720 causes charges of a particular sign rapidly accumulate in an extension 724, drop back to zero in the extension 724, and charges of the opposite sign rapidly accumulate in the extension 724. A lack of negative charges in a particular extension 724 is considered the same as positive charges accumulating in the extension 724, and vice versa. This cycle is repeated at or around the frequency of the microwave signal. As a result of the accumulation of charges in extension 724, opposite charges accumulate in the corresponding extensions 734 nearby. A relatively large time varying electric field is generated between extensions 724 and 734. Because the electro-optic material in waveguide 710 is exposed to a larger time varying electric field, the index of refraction for waveguide 710 undergoes larger changes near extensions 724 and 734. The optical signal is exposed to larger variations in index of refraction as the optical signal traverses waveguide 710 and passes extensions 724 and 734. Thus, a larger modulation in the optical signal may be achieved for a microwave signal of a given voltage amplitude applied to electrode 720. For example, optical device 700 may provide sufficient optical modulation at frequencies of up to 700-300 GHz or higher with a voltage amplitude of not more than one volt provided to electrode 720. Further, as discussed above, the presence of extensions 724 reduces the tendency of current to cluster near the edge of channel region 722 closer to waveguide 710 and mitigates losses in electrode 720. Current may be more readily driven through channel region 722 at a lower voltage and microwave losses reduced. Thus, performance of optical device 700 may be improved.

In addition, as discussed above, optical device 700 may not only reduce optical losses through waveguide 710, but also increase modulation of the optical signal through the use of a longer waveguide 710. Use of electrodes 720 and 730 having extensions 724 and 734, respectively, may reduce microwave losses, allow for a large electric field at waveguide 710/ridge 712 and improve the propagation of the microwave signal through electrodes 720 and 730, respectively. Electrodes 720 and 730 may also improve performance via velocity and phase matching. Consequently, performance of optical device 700 may be significantly enhanced.

FIG. 7B is a perspective view of optical device 700'. Optical device 700' is analogous to optical device 700. Consequently, analogous portions of optical device 700' are labeled similarly. Optical device 700' includes waveguide 710', electrode 720' and electrode 730' that are analogous to waveguide 710, electrode 720 and electrode 730, respectively. Also shown is substrate/underlying layers 701. In some embodiments, substrate 701 includes a silicon substrate and a silicon dioxide layer between the silicon substrate and waveguide 710. Other substrates may be used in other embodiments. In some embodiments, substrate 701 is a dielectric having a low microwave dielectric constant, for example a microwave dielectric constant of less than eleven. In some embodiments, the substrate has a microwave dielectric constant of less than eight. In some such embodiments, the substrate has a microwave dielectric constant of less than five. For example, substrate 701 may include sapphire, quartz and/or fused silica. In some embodiments, underlayer(s) 702 with a low microwave dielectric constant such as silicon dioxide, may be used on top of substrate 701. Other and/or additional underlayer(s) may be used in other embodiments. Further, low microwave dielectric constant underlayer(s) may be used in conjunction with other substrates with larger microwave dielectric constant. For example, a low microwave dielectric constant underlayer 702 of silicon dioxide may be provided on a substrate 701 that has a microwave dielectric constant greater than eleven, such as silicon or LN. In some embodiments, the underlayer provided is desired to be thick. For example, the underlayer may be at least three micrometers thick and not more than one hundred micrometers thick. In some embodiments, low microwave dielectric constant layer 702 has a thickness of at least four micrometers. In some embodiments, layer 702 has a thickness of at least five micrometers and not more than fifty micrometers. In some embodiments, layer 702 is not thicker than twenty micrometers. Other geometric configurations of substrate and/or underlayers may be used in some embodiments.

Waveguide 710' is used to transmit an optical signal. Waveguide 710' includes a ridge 712 and a thin film portion 714. In the embodiment shown in FIG. 7B, thin film portion 714 and ridge portion are formed from the same material (e.g. from the same thin film). Waveguide 710' may be formed of analogous materials as waveguide 710 and may have analogous performance.

Waveguide 710' may have a different configuration in some embodiments. For example, waveguide 710' may omit thin film portion 714 or reduce the size of thin film portion 714. Ridge 712 may have another configuration. For example, ridge 712 may be trapezoidal, semicircular, stacked rectangular and/or have another geometry that guides the optical signal in a manner analogous to that which is described herein. Other and/or additional materials may be used. In some embodiments, different portions of waveguide 710' are formed from different materials. For example, thin film portion 714 and ridge 712 may be formed of different materials. Thin film 714 may include a nonlinear optical material such as LN and/or LT, while ridge 712 may be formed of a passive material such as silicon and/or silicon nitride. In some embodiments, ridge 712 may be located below thin film portion 714 (e.g. ridge 712 may be between thin film portion 714 and an underlying substrate 701). Similarly, various other optical components may be incorporated into waveguide 710' to provide the desired phase modulation, polarization modulation, intensity modulation, IQ modulation, other modulation and/or other functionality. In some embodiments (not shown in FIGS. 7B-1C), waveguide 710 may include splitters to divide the optical signal into multiple branches for modulation and recombine the modulated optical signals for output. Thus, waveguide 710, as well as electrodes 720 and 730, may be configured to provide the desired functionality.

In some embodiments, the nonlinear optical material for waveguide 710' is formed as a thin film. For example, the thin film may have a thickness (e.g. of thin film portion 714 and ridge portion 712) of not more than three multiplied by the optical wavelengths for the optical signal carried in waveguide 710' before processing. In some embodiments, the thin film has a thickness (e.g. of thin film portion 714 and ridge portion 712) of not more than two multiplied by the optical wavelengths. In some embodiments, the nonlinear optical material has a thickness of not more than one multiplied by the optical wavelength. In some embodiments, the nonlinear optical material has a thickness of not more than 0.5 multiplied by the optical wavelengths. For example, the thin film may have a total thickness of not more than three micrometers as-deposited. In some embodiment, the thin film has a total thickness of not more than two micrometers. Other thicknesses, including but not limited to those described in the context of optical channels 110, may be used. The thin film nonlinear optical material may be fabricated into waveguide 710' utilizing photolithography. For example, ultraviolet (UV) and/or deep ultraviolet (DUV) photolithography may be used to pattern masks for the nonlinear optical material. For DUV photolithography, the wavelength of light used is typically less than two hundred and fifty nanometers. To fabricate the waveguide, the thin film nonlinear optical material may undergo a physical etch, for example using dry etching, reactive ion etching (RIE), inductively coupled plasma RIE. In some embodiments, a chemical etch and/or electron beam etch may be used. Waveguide 710' may thus have improved surface roughness. For example, the sidewall(s) of ridge 712 may have reduced surface roughness. For example, the short range root mean square surface roughness of a sidewall of the ridge 712 is less than ten nanometers. In some embodiments, this root mean square surface roughness is not more than five nanometers. In some cases, the short range root mean square surface roughness does not exceed two nanometers. Thus, waveguide 710' may have the optical losses in the range described above. In some embodiments, the height of ridge 712 is selected to provide a confinement of the optical mode such that there is a 70 dB reduction in intensity from the intensity at the center of ridge 712 at ten micrometers from the center of ridge 712. For example, the height of ridge 712 is on the order of a few hundred nanometers in some cases. However, other heights are possible in other embodiments.

A portion of waveguide 710' is proximate to electrodes 720 and 730 along the direction of transmission of the optical signal (e.g. from the input of the optical signal through waveguide 710' to the modulated optical signal output). The portion of waveguide 710' proximate to electrodes 720 and 730 may have the lengths described above, for example a length greater than two millimeters in some embodiments, and greater than two or more centimeters in some such embodiments. Such lengths are possible at least in part because of the low optical losses per unit length for waveguide 710 described above. Further, the portion of waveguide 710' proximate to electrodes 720 and 730 has an optical mode cross-sectional area that is small, as described above for waveguide 710.

Electrodes 720' and 730' apply electric fields to waveguide 710. Electrode(s) 720' and/or 730' may be fabricated using deposition techniques, such as electroplating, and photolithography to shape the electrode 720 and/or 730. The resulting electrode 720' and/or 730' may have a lower frequency dependent electrode loss, in the ranges described above with respect to electrodes 720 and 730. Electrode 720' includes a channel region 722' and extensions 724' (of which only one is labeled in FIG. 7B). Electrode 730' includes a channel region 732' and extensions 734' (of which only one is labeled in FIG. 7B). In some embodiments, extensions 724' or 734' may be omitted from electrode 720' or electrode 730', respectively. Extensions 724' and 734' are closer to waveguide 710' than channel region 722' and 732', respectively, are. For example, the distance, s, from extensions 724' and 734' to waveguide ridge 712 is less than the distance w from channels 722' and 732' to waveguide ridge 712. In the embodiment shown in FIG. 7B, extensions 724' and 734' are at substantially the same level as channel regions 722' and 732', respectively. In some embodiments, the extensions may protrude above and/or below the channel regions in addition to or in lieu of being at the same level.

Extensions 724' and 734' are in proximity to waveguide 710'. For example, extensions 724' and 734' are a vertical distance, d, from the thin film portion 714 of waveguide 710'. The vertical distance to waveguide 710' may depend upon the cladding (not shown in FIG. 7B) used. The distance d is highly customizable in some cases. For example, d may range from zero (or less if electrodes 720' and 730' contact or are embedded in thin film portion 714) to greater than the height of ridge 712. However, d is generally still desired to be sufficiently small that electrodes 720' and 730' can apply the desired electric field to waveguide 710'. Extensions 724' and 734' are also a distance, s, from ridge 712. Extensions 724' and 734' are desired to be sufficiently close to waveguide 710' (e.g. close to ridge 712) that the desired electric field and index of refraction change can be achieved. However, extensions 724' and 734' are desired to be sufficiently far from waveguide 710' (e.g. from ridge 712) that their presence does not result in undue optical losses. Although the distance s is generally agnostic to specific geometry or thickness of waveguide 710', s may be selected to allow for both transverse electric and transverse optical modes that are confined differently in waveguide 710'. However, the optical field intensity at extensions 724' and 734' (and more at particularly sections 724B and 734B) is desired to be reduced to limit optical losses due to absorption of the optical field by the conductors in extensions 724' and 734'. Thus, s is sufficiently large that the total optical loss for waveguide 710', including losses due to absorption at extensions 724' and 734', is not more than the ranges described above (e.g. 70 dB or less in some embodiments, 8 dB or less in some embodiments, 4 dB or less in some embodiments). In some embodiments, s is selected so that optical field intensity at extensions 724' and 734' is less than-10 dB of the maximum optical field intensity in waveguide 710. 'In some embodiments, s is chosen such that the optical field intensity at extensions 724' and 734' is less than-40 dB of its maximum value in the waveguide. For example, extensions 724' and/or 734' may be at least two micrometers and not more than 2.5 micrometers from ridge 712 in some embodiments. In some embodiments, the extensions 724' and 734' may be closer than the width of ridge 712 (i.e. the distance s<0). In such embodiments, at least extensions 724' and 734' may be above (d>ridge height) or below waveguide 710'.

In the embodiment shown in FIG. 7B, extensions 724 have a connecting portion 724A and a retrograde portion 724B. Retrograde portion 724B is so named because a part of retrograde portion may be antiparallel to the direction of signal transmission through electrode 720. Similarly, extensions 734 have a connecting portion 734A and a retrograde portion 734B. Thus, extensions 724 and 734 have a "T"-shape. In some embodiments, other shapes are possible. For example, extensions 724 and/or 734 may have an "L"-shape, may omit the retrograde portion, may be rectangular, trapezoidal, parallelogram-shaped, may partially or fully wrap around a portion of waveguide 710, and/or have another shape. Similarly, channel regions 722' and/or 732', which are shown as having a rectangular cross-section, may have another shape. Further, extensions 724' and/or 734' may be different sizes, as indicated by FIG. 7A. Although all extensions 724' and 734' are shown as the same distance from ridge 712, some of extensions 724' and/or some of extensions 734' may be different distances from ridge 712. Channel regions 722' and/or 732' may also have a varying size. In some embodiments, extensions 724' and 734', respectively, are desired to have a length, (e.g. l=w−s), that corresponds to a frequency less than the Bragg frequency of the signal for electrodes 720' and 730', respectively. Thus, the length of extensions 724' and 734' may be desired to be not more than the microwave wavelength of the electrode signal divided by x at the highest frequency of operation for electrodes 720' and 730'. In some embodiments, the length of extensions 724' and 734' is desired to be less than the microwave wavelength divided by twelve. For example, if the maximum operation frequency is 300 GHz, which corresponds to a microwave wavelength of 740 micrometers in the substrate, extensions 724' and 734' are desired to be smaller than approximately 37 micrometers. Individual extensions 724' and/or 734' may be irregularly spaced or may be periodic. Periodic extensions have a constant pitch. In some embodiments, the pitch, p, is desired to be a distance corresponding to a frequency that is less than the Bragg frequency, as discussed above with respect to the length of extensions 724' and 734'. Thus, the pitch for extensions 724' and 734' may be desired to be not more than the microwave wavelength of the electrode signal divided by x at the highest frequency of operation for electrodes 720' and 730'. In some embodiments, the pitch is desired to be less than the microwave wavelength divided by twelve. In some embodiments, the pitch is desired to be less than the microwave wavelength divided by seventy two, allowing for a low ripple in group velocity. The segments may also be narrow in some embodiments. For example, the width (l−d2) of retrograde portion 734B and connecting portion 734A may be not more than one micrometer. In some embodiments, the widths of retrograde portion 734B and connecting portion 734A are not more than five hundred nanometers. In some embodiments, this width is not more than three hundred nanometers. In some embodiments, this width is at least fifty nanometers.

Extensions 724' and 734' are closer to ridge 712 than channels 722' and 732', respectively, are (e.g. s<w). In some embodiments, a dielectric cladding (not explicitly shown in FIG. 7B) resides between electrodes 720' and 730' and waveguide 710'. As discussed above, extensions 724' and 734' are desired to have a length (w−s) that corresponds to a frequency less than the Bragg frequency of the signal for electrodes 720' and 730'. Extensions 724' and 734' are also desired to be spaced apart from ridge 712 as indicated above (e.g. such that the absorption loss in waveguide 710' can be maintained at the desired level, such as 70 dB or less). The length of the extensions 724' and 734' and desired separation from ridge 712 (e.g. s) are considered in determining w. Although described in the context of a horizontal distance for FIGS. 7A-7B, the distance between electrode structures and the waveguide also applies for vertical configurations. Other distances between waveguide 710/ridge 712 and channel regions 722 and/or 732 are possible.

The geometries of electrodes 720' and 730' are analogous to that described with respect to electrodes 720 and 730. The sizes of particular portions of extensions 724' and 734' may be varied. For example, the length, d2, of connecting portion 724A and/or 734A may be selected so that the impedance of the electrode 720' and 730' respectively, is matched to that of a driver (not shown), e.g. 50Ω. In some embodiments, the gap between extensions 734' and 724' (in which waveguide ridge 712 resides) may be configured to increase the electric field at waveguide ridge 712. In some embodiments, the gap between extensions 724' and 734' is at least one and not more than ten multiplied by the optical wavelength of the optical signal carried by waveguide 710'. However, too small a gap may cause current crowding and microwave loss in the electrode(s) 720' and/or 730'. In some embodiments, the width of a channel region 722' and/or 732' is selected to reduce microwave losses while attempting to match the microwave (electrode signal) velocity the optical signal velocity in waveguide 710. For example, electrode channel region 722' and/or 732' may have a width of at least two micrometers and not more than five hundred micrometers. The width of the retrograde portions 724B and/or 734B segments may be fine-tuned to allow low microwave losses while maintaining velocity matching and high frequency response range. For example, retrograde portions 724B and/or 734B may have a width (l−d2) of at least ten nanometers and not more than ten micrometers. The length, d3, of each retrograde portions 724B and/or 734B and the gap between adjacent retrograde portions 724B and/or 734 are chosen to allow efficient modulation and low microwave loss. For example, a duty cycle d3/(d3+d4) of at least 0.5 and not more than 0.9999 may be chosen in some embodiments. Other dimensions, including but not limited to those described herein, may be selected in some embodiments.

Optical device 700' operates in an analogous manner to optical device 700. Thus, optical device 700' may share the benefits of optical device 700. Use of nonlinear optical materials in waveguide 710' and the configuration of waveguide 710' (e.g. smoother sidewalls of ridge 712) may not only increase the electro-optic effect (e.g. provide for larger modulations in index of refraction), but also reduce optical losses. Consequently, a longer waveguide 710, larger total change in index of refraction and thus an enhanced modulation of the optical signal may be achieved. Use of electrodes 720' and 730' having extensions 724' and 734', respectively, may reduce microwave losses, allow for a large electric field at waveguide 710'/ridge 712 and improve the propagation of the microwave signal through electrodes 720' and 730', respectively. Consequently, performance of optical device 700' may be significantly enhanced.

This improvement in performance may be achieved for optical devices (e.g. 700 and/or 700') in which waveguide 710 and/or 710' includes or consists of electro-optic materials that have a microwave dielectric constant significantly exceeding the optical dielectric constant, when used at the design microwave and optical frequencies. Here for non-magnetic materials, optical index is equal to or about the square root of the optical dielectric constant. For electro-optic materials in which the microwave dielectric constant significantly exceeds the optical dielectric constant (e.g. LN and LT), the microwave dielectric constant is at least 4.5 multiplied by the optical dielectric constant. In some cases, the microwave dielectric constant is at least 2 multiplied by the optical dielectric constant. In some instances, the microwave dielectric constant is at least 5 multiplied by the optical dielectric constant. In some such materials, the microwave dielectric constant is at least 40 multiplied by the optical dielectric constant. In some embodiments, therefore, the waveguide 710' including (or consisting of) such materials has a microwave dielectric constant that exceeds the optical dielectric constant (e.g. by a factor of at least 4.5, 2, 5, 40 or more). The optical dielectric constant and microwave dielectric constant affect the speed of transmission of the optical and microwave signals, respectively. The higher the optical dielectric constant, the lower the speed of transmission of the optical signal. Similarly, the higher the microwave dielectric constant, the lower the speed of transmission of the microwave signal.

Although the optical mode is generally well confined to the waveguide, the microwave mode may extend significantly outside of the electrodes. For example, the microwave mode may extend into the waveguide. For bulk and other optical devices including waveguides formed of materials having a microwave dielectric constant that is large in comparison to the optical dielectric constant (e.g. LN and/or LT), the speed of transmission of the microwave signal in the waveguide material is reduced to a greater degree than the speed of the optical signal. Features in the electrodes, such as extensions, may also slow the transmission of the electrode signal in the electrodes. Thus, the velocity mismatch between the optical signal and the electrode signal is expected to be exacerbated by electrodes having features such as extension. In general, use of features such as extensions is disfavored in situations in which the waveguide material has a significantly larger microwave dielectric constant than optical dielectric constant (e.g. as for bulk LN and/or LT waveguides). Stated differently, the use of features on the electrodes is generally limited to cases in which the microwave dielectric constant of the waveguide material(s) is not significantly greater (e.g. by less than a factor of 4.5), about the same as, or less than the optical dielectric constant of the waveguide material(s) (e.g. III-V compounds materials such as indium phosphide and gallium arsenide).

In contrast, for optical device 700' (and 700), thin film waveguide 710' is used. In general, the optical mode is well confined to waveguide 710' (e.g. to ridge portion 712). Referring back to FIG. 7B, the optical dielectric constant of waveguide 710' thus determines the velocity of the optical signal in waveguide 710'. However, the microwave mode for the microwave signal in electrodes 720' and/or 730' may extend over many structures. Referring back to FIG. 7B, the velocity of the microwave signal through electrodes 720' and 730' may thus be found using the microwave dielectric constant of multiple structures such as electrodes 720' and 730', waveguide 710', low dielectric constant layer 702 between substrate/underlayer(s) 701 and electrodes 720' and 730', substrate/underlayers 701, and air or any structures (not shown) above electrodes 720' and 730'. Thus, the contribution of the (large) microwave dielectric constant of waveguide 710' materials (e.g. LT and LN) may be mitigated by the (lower) microwave dielectric constant of surrounding structures. As such, the velocity mismatch between the optical signal in waveguide 710' and the electrode signal for electrode(s) 720' and/or 730' may still be mitigated while achieving the other benefits of extensions 724 and/or 754'.

Use of optical devices 700 and/or 700' in optical device(s) 100, 200, 300, 400, 500, and/or 600 may further improve performance. For example, modulation of the optical signal may be improved, microwave and optical losses reduced, and velocity matching enhanced while providing a device in a compact form factor. Further, although various configurations are explicitly depicted for electro-optic devices 100, 200, 300, 400, 500, 600, 700, and 700', various features described herein may be combined in manners not explicitly shown.

Figure 8:
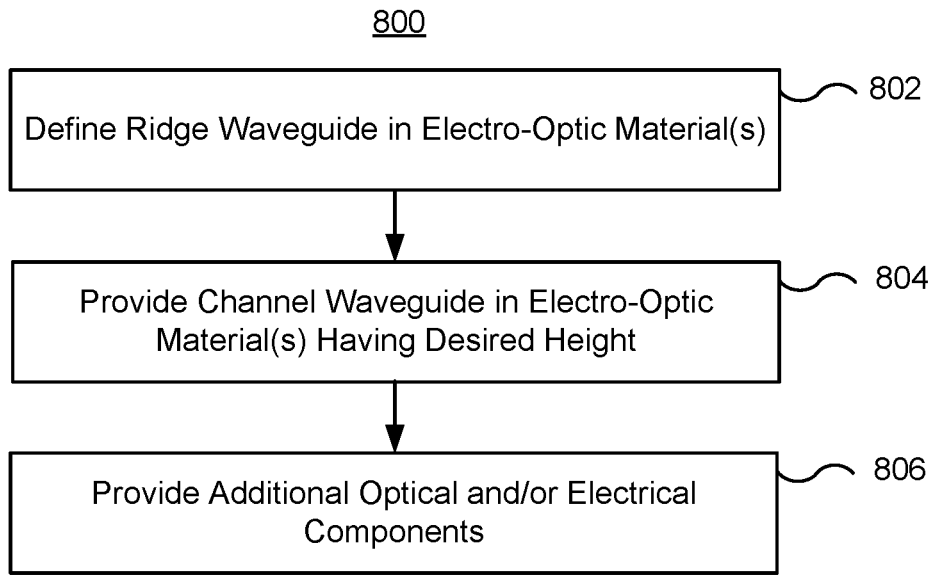
FIG. 8 is a flow chart depicting an embodiment of a method for providing an optical device.

FIG. 8 is a flow chart depicting an embodiment of method 800 for providing an optical device. Other and/or additional processes may be used. Further, one or more steps of method 800 may include multiple substeps. Method 800 is also described in the context of forming a single electro-optic device. However, multiple devices may be formed in parallel. Method 800 is also described in the context of electro-optic device 100. Method 800 may be used in fabricating other electro-optic devices, such as devices 200, 300, 400, 500, 600, and/or 700.

A ridge waveguide is defined from one or more electro-optic materials, at 802. In such embodiments, 802 operates on pre-existing electro-optic materials. For example, 802 may include etching an LN and/or LT layer that has already been fabricated on a substrate. In other embodiments, 802 includes depositing and etching the electro-optic materials. At 802, a mask covering the region of the electro-optic material(s) desired to form the ridge is provided and one or more etches performed to define the ridge. Thus, the sidewalls of the ridge may be defined. The heights of the ridge and slab are also defined. 802 may also include defining the edges of the slab, for example using a different mask and another etch process. In some embodiments, 802 is performed using DUV lithography and physical etch processes, such as RIEs. As a result of 802, a ridge waveguide having a ridge residing on a slab is formed. The ridge height of the ridge is greater than the slab height of the slab.

A channel waveguide is also fabricated from electro-optic material(s), at 804. In some embodiments, the channel waveguide is fabricated from the same electro-optic material(s) as used for the ridge waveguide at 802. Thus, 804 may include performing one or more other etches. In some embodiments, a portion of the channel waveguide may be fabricated as part of 802. For example, the sidewalls of the channel waveguide may be defined in conjunction with the sidewalls of the slab. 804 may complete fabrication of the channel waveguide, for example by thinning the channel waveguide. In other embodiments, the channel waveguide may be separately fabricated. In such embodiments, the same or different electro-optic material(s) may be used. If the channel waveguide is separately fabricated, 804 may include depositing and etching the electro-optic material(s) or selectively depositing the electro-optic material(s) used. The channel waveguide formed at 804 has a smaller channel height than the slab height of the slab. In some embodiments, the channel waveguide formed at 804 is narrower than any portion of the slab. In some embodiments, 804 includes using DUV photolithography and physical etch processes.

Additional components (e.g. optical and/or electrical components) for the electro-optic device are formed, at 806. For example, 806 may include fabricating electrodes. Other components, such as passive optical components, may also be formed at 806. In some embodiments some or all of the passive optical components considered to be formed at 806 may be fabricated using etches performed for 802 and/or 804.

For example, ridge waveguide 110 may be fabricated at 802. In such embodiments, 802 may include masking and etching an LN and/or LT layer that has already been fabricated on a substrate. Ridge 114 is thus provided. At 804 the sidewalls of slab 112 are formed. Thus, ridge waveguide 110, as well as the sidewalls of tapered region 140 and channel waveguide 120 are defined. At 804 the formation of channel waveguide 120 may be completed. For example, the height of channel waveguide 120 may be reduced to be less than that of slab 112. Additional components, such as electrodes 132 may be formed at 806.

Thus, an electro-optic device having a ridge waveguide and a channel waveguide may be provided. The slab of the ridge waveguide has a different height than the channel waveguide. Consequently, the channel waveguide may be independently optimized from the ridge waveguide. A smaller height allows the channel waveguide to increase the size of the mode of the optical signal transmitted while maintaining lower losses (e.g. losses not exceeding 1 or 2 dB). The larger height of the slab allows for improved concentration of the electric field from the electrodes at the ridge (i.e. in the location of the optical mode). Consequently, a lower $V\pi$ may be maintained for the electro-optic device. Thus, performance of both the channel waveguide and the electro-optic device may be improved. Further, fabrication of the channel waveguide is facilitated. Because the channel waveguide has a smaller height, the width of channel waveguide may be increased over that of a thicker channel waveguide while providing the same performance (e.g. analogous mode size and losses). This may facilitate the size of the channel waveguide remaining within the limits of the fabrication tools, such as DUV photolithographic tools. Thus, using method 800, an electro-optic device in which the properties of the channel waveguide, for example for a mode converter, are separately tailored from properties of the electro-optic device using the ridge waveguide. Consequently, performance of both components as well as manufacturability of the electro-optic device may be improved.

Figure 9:
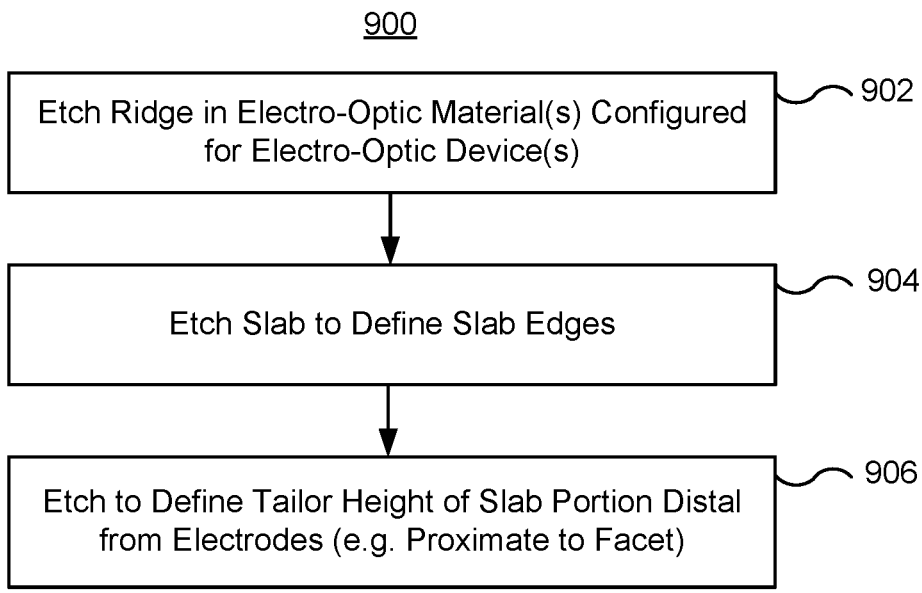
FIG. 9 is a flow chart depicting an embodiment of a method for providing an electro-optic device.

FIG. 9 is a flow chart depicting an embodiment of method 900 for providing an electro-optic device. Other and/or additional processes may be used. Further, one or more steps of method 900 may include multiple substeps. Method 900 is also described in the context of forming a single electro-optic device. However, multiple devices may be formed in parallel. Method 900 is also described in the context of electro-optic device 100. Method 900 may be used in fabricating other electro-optic devices, such as devices 200, 300, 400, 500, 600, and/or 700. In some embodiments, method 900 may be viewed as a technique for carrying out 802 and 804 of method 800.

An etch, such as one or more physical etch processes, is used to define a ridge for a ridge waveguide from one or more electro-optic materials, at 902. In such embodiments, 902 etches pre-existing electro-optic materials, for example LN and/or LT layer(s) that have already been fabricated on a substrate. At 902, a mask covering the region of the electro-optic material(s) desired to form the ridge may be provided via DUV photolithography. One or more etches may be performed to remove the portion of the electro-optic material exposed by the mask, thereby defining the ridge. Thus, the sidewalls of the ridge may be defined.

A second etch (e.g. such as one or more physical etch processes) is performed to define the sidewalls (i.e. edges) of the slab for the ridge waveguide, at 904. In some embodiments, 904 includes providing a mask exposing remaining portions of the electro-optic materials desired to be removed and etching the exposed portions. The mask for 904 may also be provided using DUV photolithography. Also at 904, the edges of the channel waveguide, tapered region, transitional region and/or other optical components fabricated from the slab may be defined.

An etch (such as one or more physical etch processes) that tailors the height of the channel waveguide is performed, at 906. In some embodiments, the etch performed at 906 also changes the height of other regions, such as the transitional region. 906 also includes providing a mask (e.g., via DUV photolithography) and performing one or more etches. The masks and/or etch processes performed at 906 may be configured in different manners in order to provide different geometries of the electro-optic device being fabricated. In some embodiments, the mask exposes the entire region of the electro-optic device that is at or near the channel waveguide. Thus, the ridge waveguide and tapered region may be covered, while the transitional region, channel waveguide, and surrounding areas may be exposed. In some embodiments, the edge of the mask may be at an acute angle with respect to the long axis of the ridge for the ridge waveguide. In such embodiments, the height of the channel waveguide (and, optionally, the transitional region) decreases with decreasing distance to the facet. Other configurations of masks may be used in other embodiments. Thus, the electro-optic material(s) can be etched to fabricate and independently tailor the desired optical components.

For example, ridge 114 of ridge waveguide 110 may be defined from a layer of existing electro-optic material(s), at 902. As a result, the heights of ridge 114 and sidewalls 112 (i.e. h1 and h2) are determined. At 904 the sidewalls of slab 112 are defined. Thus, the edges of the tapered region 140 and channel waveguide 120 are also formed. In some embodiments, ridge 114 is also tapered such that ridge 114 terminates in tapered region 140. At 906 an etch is performed to define the height of channel waveguide 120, as well as any transitional regions such as region 222. Thus, the height, h3, of channel waveguide 120 may configured using a different etch than the etch that defines the height, h1, of slab 112. As such, the heights of slab 112 and channel waveguide 120 are separately optimizable.

Figure 10:
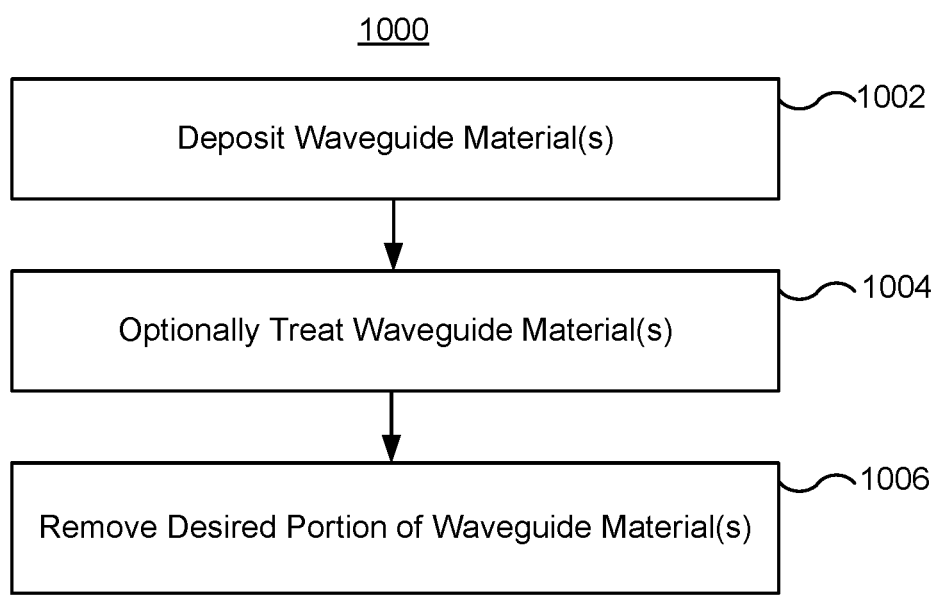
FIG. 10 is a flow chart depicting an embodiment of a method for providing an electro-optic device.

FIG. 10 is a flow chart depicting an embodiment of method 1000 for providing an electro-optic device. Other and/or additional processes may be used. Further, one or more steps of method 1000 may include multiple substeps. Method 1000 is also described in the context of forming a single electro-optic device. However, multiple devices may be formed in parallel. Method 1000 is also described in the context of electro-optic device 300. Method 1000 may be used in fabricating other electro-optic devices, such as devices 100, 200, 400, 500, 600, and/or 700. In some embodiments, method 1000 may be viewed as a technique for carrying out 802 and 804 of method 800. In some embodiments, method 1000 may be used for materials such as SiN, SiON, and/or SU-8 (e.g. some photoresists).

The waveguide material(s) for the channel waveguide are provided, at 1002. Thus, material(s) such as SiN, SiON, and/or SU-8 are deposited. In some embodiments, method 1000 uses a deposit-and-etch process. In such embodiments, the waveguide material(s) may be blanket deposited at 1002. In addition, a mask covering the portion of the waveguide material(s) used for the channel waveguide is provided. In some embodiments, a lift-off process is used. In such embodiments, a mask exposing the region(s) on which the channel waveguide is desired to reside is provided and the waveguide material(s) deposited on the mask at 1002. The deposit-and-etch and lift-off processes may be used for non-photosensitive materials such as SiN and/or SiON. For photosensitive materials such as SU-8, 1002 includes depositing the material(s).

The waveguide material(s) may be treated, at 1004. For example photosensitive material(s) such as SU-8 may be patterned, for example using photolithography. Thus, the chemical properties of portions of the waveguide material(s) may be altered. In some embodiments, the polymer materials are baked to force a glass transition. The desired portion of the waveguide material(s) are removed, at 1006. In some embodiments, 1006 includes performing an etch on waveguide materials that are partially covered by a mask (i.e. in a deposit-and-etch process). In some embodiments, the mask under the waveguide materials may be removed (i.e. in a lift-off process). The portion of the waveguide material(s) on the mask are, therefore, also removed. Thus, the remaining portions of the waveguide material(s) form the channel waveguide.

For example, waveguide materials for channel waveguide 320 might be deposited at 1002 and, optionally, treated at 1004. At 1006, the desired portion of the waveguide material(s) are removed. Thus, channel waveguide 320 remains. Note that in some embodiments, the waveguide material(s) used for method 1000 may have a significantly lower index of refraction than LN and/or LT. In such embodiments, the channel waveguide formed by method 1000 may not have height h3 (channel waveguide height) smaller than h1 (slab height). For example, such materials such as SiON, the waveguide may have a height of five micrometers and a similar width in some embodiments. Thus, other fabrication methods and/or geometries (e.g. waveguide size) are possible if other waveguide material(s) are used for the channel waveguide.

Thus, electro-optic devices having separately optimizable ridge waveguides and channel waveguides may be provided. More specifically, the slab of the ridge waveguide can have a different height than the channel waveguide. A smaller height allows the channel waveguide to increase the size of the mode of the optical signal transmitted while maintaining lower losses and having a larger width. The larger height of the slab allows for improved concentration of the electric field from the electrodes at the ridge. Consequently, a lower Vπ may be maintained for the electro-optic device. Thus, performance of both the channel waveguide and the electro-optic device may be improved. Further, fabrication of the channel waveguide is facilitated because the width of the channel waveguide may be increased. Thus, using method 900, an electro-optic device in which the properties of the channel waveguide (e.g. for a mode converter) are separately tailored from properties of the ridge waveguide (e.g. for a modulator). Consequently, performance of both components as well as manufacturability of the electro-optic device may be improved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An electro-optic device, comprising:
a ridge waveguide including a first portion of at least one electro-optic material, the first portion of the at least one electro-optic material including a slab and a ridge on the slab, the ridge having a ridge height, the slab having a slab height less than the ridge height;
a channel waveguide optically coupled with the ridge waveguide and including a second portion of the at least one electro-optic material, the channel waveguide having a channel height less than the slab height; and
at least one passive functionality component optically coupled with the channel waveguide, the at least one passive functionality component having a component height, the component height being at least the channel height and not greater than the slab height.

2. The electro-optic device of claim 1, further comprising:
a tapered region including a third portion of the at least one electro-optic material and coupling the ridge waveguide with the channel waveguide, the ridge of the ridge waveguide terminating in the tapered region.

3. The electro-optic device of claim 2, wherein the tapered region has a loss of not more than 1 dB.

4. The electro-optic device of claim 2, wherein a portion of the channel waveguide is adjacent to the tapered region, and wherein the at least one electro-optic material includes a first electro-optic material for the ridge waveguide and a second electro-optic material for the channel waveguide.

5. The electro-optic device of claim 1, further comprising:
a transitional region including a third portion of the at least one electro-optic material, the transitional region being between and optically coupled with the channel waveguide and the ridge waveguide, the transitional region having a varying height transitioning between the slab height proximate to the ridge waveguide and the channel height proximate to the channel waveguide.

6. The electro-optic device of claim 1, wherein the channel waveguide includes a taper such that the channel waveguide has a first width proximate to the ridge waveguide and a second width distal from the ridge waveguide, the second width being less than the first width.

7. The electro-optic device of claim 6, wherein the second width is not less than one hundred and fifty nanometers, the second width being configured such that the channel waveguide is optically coupled with an optical fiber having an optical mode field diameter of at least 2.5 micrometers.

8. The electro-optic device of claim 1, wherein the at least one electro-optic material includes at least one of lithium niobate or lithium tantalate.

9. The electro-optic device of claim 1, further comprising:
a plurality of electrodes, a portion of the slab being between the ridge and the plurality of electrodes.

10. The electro-optic device of claim 1, wherein the channel waveguide further includes:
an additional channel waveguide adjacent to the channel waveguide and having an additional channel height less than the slab height.

11. An electro-optic device, comprising:
an optical modulator including a first portion of a ridge waveguide and a plurality of electrodes, the ridge waveguide including a first portion of at least one electro-optic material, the of portion of the at least one electro-optic material forming a slab and a ridge on the slab, the ridge having a ridge height, the slab having a slab height less than the ridge height, the at least one electro-optic material including at least one of lithium niobate and lithium tantalate;
a tapered region including a second portion of the at least one electro-optic material, the ridge of the ridge waveguide terminating in the tapered region; and
a mode converter optically coupled with the tapered region and including a channel waveguide, the channel waveguide including a third portion of the at least one electro-optic material and having a channel height less than the slab height;

wherein the optical modulator and mode converter are independently optimized.

12. A method for providing an electro-optic device, comprising:

defining a ridge waveguide from at least one electro-optic material, the ridge waveguide including a slab and a ridge on the slab, the ridge having a ridge height, the slab having a slab height less than the ridge height;

providing a channel waveguide in the at least one electro-optic material, and the channel waveguide being optically coupled with the ridge waveguide and having a channel height less than the slab height; and providing at least one passive functionality component optically coupled with the channel waveguide, the at least one passive functionality component having a component height, the component height being at least the channel height and not greater than the slab height.

13. The method of claim 12, wherein the defining the ridge waveguide further includes:

defining the ridge from the at least one electro-optic material in a first etch; and defining a plurality of edges for the slab in a second etch.

14. The method of claim 13, wherein the providing the channel waveguide further includes:

defining a plurality of sidewalls of the channel waveguide in the second etch; and defining the channel height in a third etch.

15. The method of claim 12, further comprising:

providing a tapered region in the at least one electro-optic material, the tapered region coupling the ridge waveguide with the channel waveguide, the ridge terminating in the tapered region.

16. The method of claim 12, further comprising:

providing a transitional region in the at least one electro-optic material, the transitional region being between and optically coupled with the channel waveguide and the ridge waveguide, the transitional region having a varying height transitioning between the slab height proximate to the ridge waveguide and the channel height proximate to the channel waveguide.

17. The method of claim 12, wherein the providing the channel waveguide further includes:

providing a taper for the channel waveguide, the taper being configured such that the channel waveguide has a first width proximate to the ridge waveguide and a second width distal from the ridge waveguide, the second width being less than the first width.

18. The method of claim 17, wherein the second width is not less than one hundred and fifty nanometers, the second width being configured such that the channel waveguide is optically coupled with an optical fiber having an optical mode field diameter of at least 2.5 micrometers.

19. The method of claim 12, wherein the electro-optic material includes at least one of lithium niobate and lithium tantalate.

* * * * *